United States Patent
Wakita

(10) Patent No.: US 7,072,826 B1
(45) Date of Patent: Jul. 4, 2006

(54) LANGUAGE CONVERSION RULE PREPARING DEVICE, LANGUAGE CONVERSION DEVICE AND PROGRAM RECORDING MEDIUM

(75) Inventor: Yumi Wakita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,921

(22) PCT Filed: Jun. 2, 1999

(86) PCT No.: PCT/JP99/02954

§ 371 (c)(1),
(2), (4) Date: Dec. 4, 2000

(87) PCT Pub. No.: WO99/63456

PCT Pub. Date: Dec. 9, 1999

(30) Foreign Application Priority Data

| Jun. 4, 1998 | (JP) | ................................. 10/155550 |
| Feb. 17, 1999 | (JP) | ................................. 11/039253 |
| Feb. 19, 1999 | (JP) | ................................. 11/041186 |

(51) Int. Cl.
*G06F 17/27* (2006.01)

(52) U.S. Cl. ............................................. 704/2; 704/9

(58) Field of Classification Search ................... 704/1, 704/2, 9, 10
See application file for complete search history.

(56) References Cited

U.S. PATENT DOCUMENTS 4,942,526 A * 7/1990 Okajima et al. ............... 704/10

(Continued)

FOREIGN PATENT DOCUMENTS

JP 64-70871 3/1989

(Continued)

OTHER PUBLICATIONS

Japanese Office Action for Japanese Application No. 11-156484 dated Mar. 11, 2003 (with partial English translation).

(Continued)

*Primary Examiner*—Richemond Dorvil
*Assistant Examiner*—Michael N. Opsasnick
(74) *Attorney, Agent, or Firm*—RatnerPrestia

(57) ABSTRACT

When a portion of an input speech sentence contains an untrained portion or when speech recognition is partly erroneously performed, transference to the target language is disabled. Moreover, a phrase dictionary and interphrase rules which are necessary for transference must be manually produced. Therefore, development is low in efficiency and requires much labor.

An apparatus includes: a language rule producing section which statistically automatically trains grammatical or semantic restriction rules for a partial word or a word string from a parallel-translation corpus, and in which rules are described in the form wherein a source language partial sentence corresponds to a target language partial sentence; a speech recognizing section which performs speech recognition on speech of the source language by using the produced language rules, and which outputs a result of the recognition; and a language transferring section which transfers a source language sentence into a target language sentence by using the same language rules. Even when a portion of an input speech sentence contains an untrained portion or when speech recognition is partly erroneously performed, transference to the target language is surely enabled. Moreover, a phrase dictionary and interphrase rules which are necessary for transference can be automatically produced without requiring much manual assistance.

3 Claims, 17 Drawing Sheets

U.S. PATENT DOCUMENTS

| | | | | |
|---|---|---|---|---|
| 5,225,981 | A * | 7/1993 | Yokogawa | 704/2 |
| 5,351,189 | A * | 9/1994 | Doi et al. | 704/3 |
| 5,353,221 | A * | 10/1994 | Kutsumi et al. | 704/5 |
| 5,418,717 | A * | 5/1995 | Su et al. | 704/9 |
| 5,477,451 | A * | 12/1995 | Brown et al. | 704/9 |
| 5,687,384 | A * | 11/1997 | Nagase | 704/9 |
| 5,819,221 | A * | 10/1998 | Kondo et al. | 704/255 |
| 6,024,571 | A * | 2/2000 | Renegar | 434/157 |
| 6,282,507 | B1 * | 8/2001 | Horiguchi et al. | 704/3 |
| 6,349,276 | B1 * | 2/2002 | McCarley | 704/8 |
| 6,567,778 | B1 * | 5/2003 | Chao Chang et al. | 704/257 |

FOREIGN PATENT DOCUMENTS

| | | |
|---|---|---|
| JP | 8-328585 | 12/1996 |

OTHER PUBLICATIONS

M. Kitamura et al., "Automatic Acquisition of Translation Rules from Parallel Corpora," vol. 37, No. 6, Jun. 15, 1996, pp. 1030-1040 (with English translation of Fig. 1 and Table 5).

O. Furuse et al., "Transfer-Driven Machine Translation Utilizing Empirical Knowledge," *The Transaction of Information Processing Society of Japan,* vol. 35, No. 3, Mar. 1994, pp. 414-425.

T. Takezawa et al., "Dialogue Speech Recognition Method Using Syntatic Rules Based on Subtrees And Preterminal Bigrams," *The Transaction of the Institute of Electronics and Communication Engineers,* vol. J79-D-II, No. 12, Dec. 1996, pp. 2078-2085.

K. Ohmori et al., "Extracting Translation Uninterrupted Collocations From Bilingual Corpora", vol. 97, No. 109, Nov. 21, 1997, pp. 13-20.

European Search Report dated Sep. 7, 1999, Application No. PCT/JP99/02954.

* cited by examiner

| (rule number)<br><occurrence number> | source language rule | target language rule |
|---|---|---|
| (rule 1) <15> | をしたいんですが<br>[ O SHITAINDESUGA ] | I'd like to |
| (rule 2) <6> | をお願いします<br>[ O ONEGAISHIMASU ] | I'd like to |
| (rule 4) <13> | お願いします<br>[ ONEGAISHIMASU ] | please |

Fig. 7

```
[parallel-translation
  sentence 1]: (一般名詞[common noun])の[NO] (サ変名詞["S" series irregular conjugation noun])
              | お願いします [ONEGAISHIMASU]
              I'd like to | (サ変名詞["S" series irregular conjugation noun]) a (一般名詞[com-
              mon noun])
[parallel-translation
  sentence 2]: (一般名詞[common noun]) | お願いします [ONEGAISHIMASU]
              I'd like to | (一般名詞[common noun])
[parallel-translation
  sentence 3]: (一般名詞[common noun]) | を [O] | (動詞[verb]) | たいんですが [TAINDESUGA]
              I'd like to | (動詞[verb]) | (一般名詞[common noun])
```
~130

```
[phrase 1]: お願いします [ONEGAISHIMASU]  :I'd like to | 2/(3+2)
[phrase 2]: たいんですが [TAINDESUGA]     :I'd like to | 1/(3+1)
[phrase 3]: (一般名詞[common noun])の[NO] (サ変名詞["S" series irregular conjugation noun])
           (サ変名詞["S" series irregular conjugation noun]) a (一般名詞[common noun]) |
[phrase 4]: (一般名詞[common noun]) : (一般名詞[common noun]) |
[phrase 5]: (動詞[verb]) : (動詞[verb]) |
```
~131

```
[phrase 3] [phrase 1] : [phrase 2] [phrase 3]
[phrase 4] [phrase 1] : [phrase 4] [phrase 1]
[phrase 4] [phrase 5] [phrase 2] : [phrase 2] [phrase 5] [phrase 4]
```
~132

```
格助詞[case particle]+動詞[verb] or phrase containing 動詞[verb]
動詞[verb]+ 助動詞[auxiliary verb] or phrase containing 助動詞[auxiliary verb]
形容詞[adjective]+名詞[noun]
...
```
141

```
[parallel-translation   (一般名詞[common noun])の[NO] (サ変名詞["S" series irregular conjugation
      sentence 1]:    noun]) | お願いします [ONEGAISHIMASU]
                       I'd like to | (サ変名詞["S" series irregular conjugation noun]) a
                       (一般名詞[common noun])
[parallel-translation   :(一般名詞[common noun]) | お願いします [ONEGAISHIMASU]
      sentence 2]:     I'd like to | (一般名詞[common noun])
[parallel-translation   :(一般名詞[common noun]) | を [O] (動詞[verb]) たいんですが [TAINDESUGA]
      sentence 3]:     I'd like to (動詞[verb]) a (一般名詞[common noun])
```

152

```
[phrase 1]: お願いします [ONEGAISHIMASU]  :I'd like to | 2/(3+2)
[phrase 2]: を (動詞[verb]) たいんですが [TAINDESUGA]   :I'd like to (動詞[verb]) | 1/(3+1)
[phrase 3]: (一般名詞[common noun])の[NO] (サ変名詞["S" series irregular conjugation noun]) |
            (サ変名詞["S" series irregular conjugation noun]) a (一般名詞[common noun]) |
[phrase 4]: (一般名詞[common noun]) : (一般名詞[common noun]) |
```

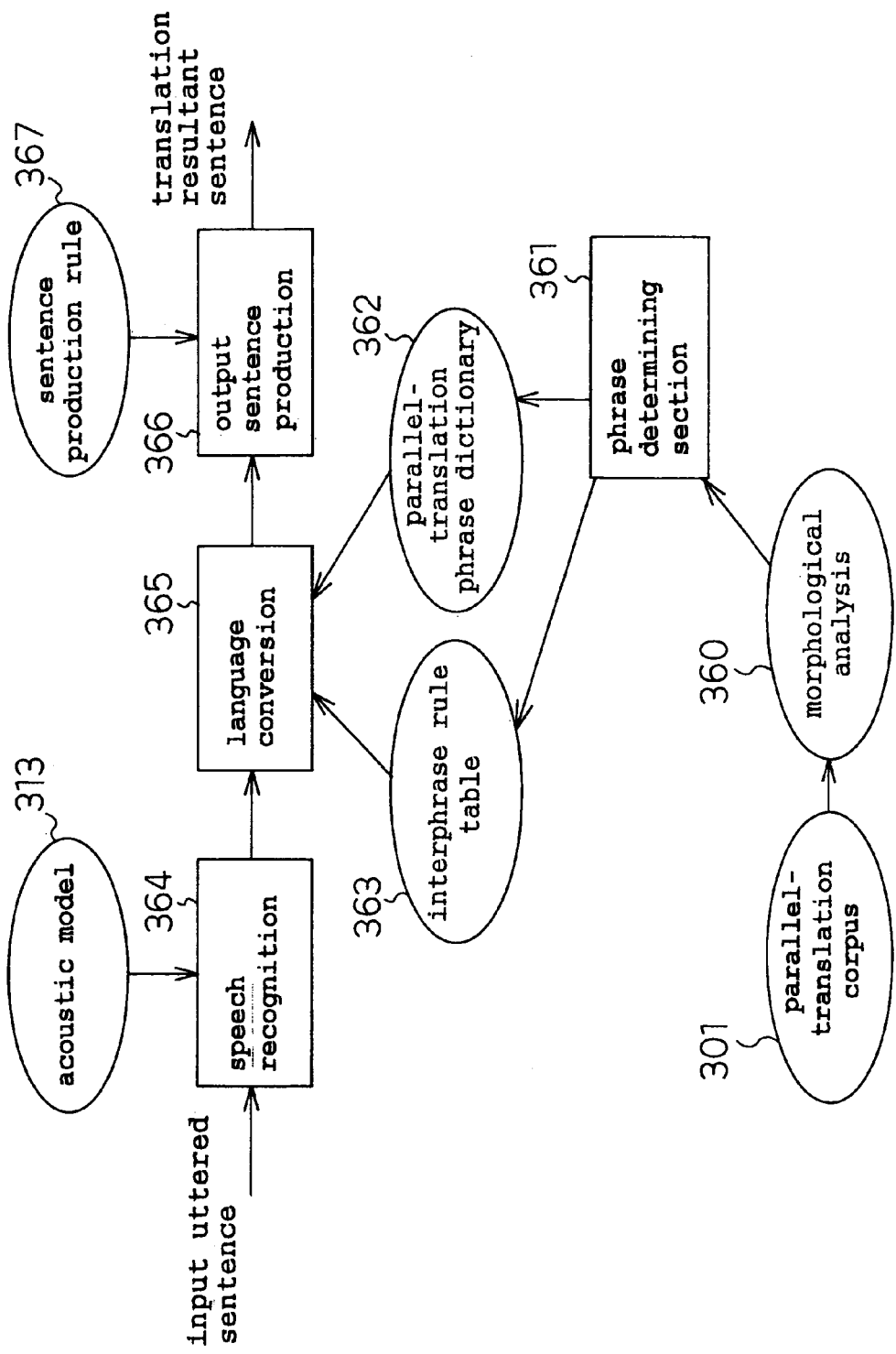

LANGUAGE CONVERSION RULE PREPARING DEVICE, LANGUAGE CONVERSION DEVICE AND PROGRAM RECORDING MEDIUM

This application is a U.S. National Phase application of PCT International Application PCT/JP99/02954.

TECHNICAL FIELD

The invention relates to a language transferring apparatus which transfers input speech or an input text into another language or another literary style, and also to a language transference rule producing apparatus which produces transference rules for the same.

BACKGROUND ART

Hereinafter, the conventional art will be described with taking as an example an apparatus which is one of language transferring apparatuses, and which translates input speech into another language (hereinafter, referred to as interpretation).

In an interpreting apparatus, interpretation is realized by sequentially interpreting speech recognition for transferring an uttered sentence which is input as a sound signal into an output sentence that is indicated by a word text string, and language translation which receives the sentence indicated by the word text string, and then translates it into a sentence of another language. The language translating section is configured by: a language analyzing section which analyzes the syntactic or semantic structure of the input sentence; a language transferring section which transfers the input sentence into another language on the basis of a result of the analysis; and an output sentence producing section which produces a natural output sentence from a result of the translation.

In a case where the speech recognizing section erroneously recognizes a part of the uttered sentence, or a case where the uttered sentence itself is unnatural in both syntactic and semantic meanings, such as those where chiming, restating, or the like is inserted into the sentence, or where utterance is ended while the sentence has not yet been completed, however, there arises a problem in that, even when a result of speech recognition is input into the language analyzing section, analysis is failed and therefore a result of translation is not output.

In order to solve the problem, a configuration is proposed in which a sentence is divided into phrases, intraphrase rules and interphrase rules are separately made, and incomplete utterance is analyzed by using only the intraphrase rules, thereby enabling a result of the analysis to be output. (For example, Takezawa and Morimoto: The Transaction of the Institute of Electronics and Communication Engineers D-II, Vol. J79-D-II(12)) FIG. 14 shows an example of intraphrase and interphrase rules of the conventional art. In this example, with respect to a corpus example 301 of "KONBAN, SINGLE NO HEYA NO YOYAKAU ONEGAI NE", intraphrase rules are described in a tree structure such as intraphrase rules 302, on the basis of grammar rules which are common also to written language, and interphrase rules are described in the term of adjacency probability among phrases in a training corpus. For example, the interphrase rules are described as shown in interphrase rules 303.

When an input sentence is to be analyzed, the intraphrase rules are sequentially applied to phrases with starting from the beginning of the sentence. The input sentence is analyzed while the phrases are connected to one another so that, for each phrase, phrase candidates of higher adjacency probability are adjacent to each other. In this sentence analyzing method, even when a part of a sentence is erroneously recognized and usual analysis of the whole sentence fails, phrases of the portion which does not include erroneous recognition can be correctly analyzed. Therefore, a scheme is made so that a translation result can be partially output by translating only the analyzed partial phrases.

In order to solve the problem, another method is proposed in which, unlike the conventional art in which language analysis is performed in accordance with the grammar, parallel-translation phrases of corresponding source language and target language sentences are extracted from uttered sentence examples including uttered sentences which cannot be analyzed by the conventional grammar, a parallel-translation phrase dictionary in which the phrase pair is described in a form that is generalized as far as possible is produced, and language analysis and language transference are performed by using the dictionary. (For example, Furuse, Sumida, and Iida: The Transaction of Information Processing Society of Japan Vol 35, no 3, 1994-3) FIG. 15 shows a language transference rule producing apparatus of the conventional art. Before interpretation is performed, a parallel-translation phrase dictionary is previously produced from an uttered sentence parallel-translation corpus. Also in this method, in consideration a case where a part of words are erroneous or omitted, an uttered sentence is divided into phrases, and intraphrase rules and dependency rules between the phrases are produced. First, a morphological analyzing section 360 analyzes morphemes of the source language sentence and the target language sentence, and transfers the sentences into morpheme strings. Next, a phrase determining section 361 divides the morpheme strings of the source language and the target language in the unit of phrase, and then produces intraphrase rules and dependency relationship rules between the phrases. In this case, each phrase unit is manually determined in consideration that, in partial sentences, the correspondence relationships in the parallel translation are apparent, in addition that each phrase unit is a unit which is semantically consistent. For example, a parallel-translation sentence example of "HEYA NO YOYAKU O ONEGAISHITAINDESUGA" and "I'd like to reserve a room" are divided into two parallel-translation phrases (a) and (b), or (a) "HEYA NO YOYAKU" and "reserve a room", and (b) "O ONEGAISHITAINDESUGA" and "I'd like to", and a dependency relationship of "(a) O (b) SURU" and "(b) to (a)" is regularized. The parallel-translation phrases are stored in a parallel-translation phrase dictionary 362, and the dependency relationship between the phrases which is expressed in the form of parallel translation is stored in an interphrase rule table 363. This process is performed on all uttered sentences included in the parallel-translation corpus. This division and dependency relationship of phrases are determined depending on semantic information of a sentence and factors such as the degree at which the sentence is ungrammatical. Therefore, it is difficult to automatically determine them for each sentence. Conventionally, consequently, they are manually determined.

In the sentence analyzing means of the first conventional example, however, phrases to be handled are language-dependent phrases which are dependent only on the source language, and often fail to coincide with phrase units of the target language. Therefore, the means has a problem in that, even when phrases which are correct in the source language are input into the language transferring section, it is often that the phrases cannot be finally accepted. The scheme of the first conventional example is enabled also by using language-independent phrases. In this case, analysis of language-independent phrases must be manually produced, thereby causing further problems in that the development requires a lot of time, and that rule performances are distorted by swinging of criteria of the manual production.

In the method of producing a parallel-translation phrase dictionary in the second conventional example, there is no means for automatically analyzing semantic information and grammatical information of an uttered sentence, and hence such information must be manually produced. Therefore, the method has problems in that the development requires a lot of time, and that rule performances are distorted by swinging of criteria of the manual production. When the target task of an interpreting apparatus is changed, or when the kinds of the source language and the target language are changed, rules which have been once established cannot be applied, and all of the rules must be again produced. Therefore, the development is low in efficiency and cumbersome.

In the phrase dictionary 362 and the interphrase rule table 363, a phrase unit is determined with placing emphasis on the correspondence relationships of the parallel-translation corpus, and the phrase unit is not evaluated whether it is adequate for recognition by the speech recognizing section 364 or not. It is difficult to determine a phrase unit while manually judging whether the phrase is adequate for speech recognition or not. The method has a problem in that, when recognition is performed by using the determined phrase, it is not guaranteed to ensure the recognition rate.

DISCLOSURE OF INVENTION

It is an object of the invention to provide a language transferring apparatus method which can solve the above-discussed problems, in which, even when an input speech sentence contains an untrained portion or when speech recognition is partly erroneously performed, transference to the target language is surely enabled, and in which a phrase dictionary and interphrase rules required for transference can be automatically produced without requiring much manual assistance.

In order to solve the problems, a first aspect of the invention is directed to a language transferring apparatus characterized in that the apparatus comprises: storing means for storing language rules which are obtained by training grammatical or semantic restriction rules for a word or a word string from a training database in which a sentence that is input in a form of speech or text, and that is a tar get language transference (hereinafter, such a sentence is referred to as a source language sentence, and a sentence that has undergone language transference correspondingly with it is referred to as a target language sentence) is paired with a target language sentence (hereinafter, such a database is referred to as a parallel-translation corpus);

a speech recognizing section which performs speech recognition on input speech by using the stored language rules, and which outputs a result of the recognition in a form of a sentence that is a target language transference; and a language transferring section which transfers a sentence that is a target language transference, into a sentence that has undergone language transference, by using the same language rules as that used in the speech recognizing section.

Furthermore, a second aspect of the invention is directed to a language transferring apparatus according to the first aspect of the invention and characterized in that the language rules are produced by dividing the sentence that is a target language transference, and the transferred sentence into portions in which both the sentences form semantic consistency (referred to as style-independent phrases), and making rules with separating language rules in the style-independent phrases from language rules between the style-independent phrases.

Furthermore, a third aspect of the invention is directed to a language transferring apparatus according to the second aspect of the invention and characterized in that the language rules are produced by making rules on grammatical or semantic rules in the style-independent phrases and concurrent or connection relationships between the style-independent phrases.

Furthermore, a fourth aspect of the invention is directed to a language transferring apparatus according to the first aspect of the invention and characterized in that the apparatus comprises a speech synthesizing section which performs speech synthesis on the sentence that has undergone language transference, by using a same language rules as that used in the language transferring section.

Furthermore, a fifth aspect of the invention is directed to a language transferring apparatus according to any of the first to fourth aspects of the invention and characterized in that the apparatus comprises: a rule distance calculating section which, for a language rule group which is obtained by, among the language rules, bundling language rules of a same target language sentence as a same category, calculates an acoustic rule distance of the sentence that is a target language transference of language rules contained in the language rule group; and an optimum rule producing section which, in order to enhance a recognition level of speech recognition, optimizes the rule group by merging language rules having a similar calculated distance.

A sixth aspect of the invention is directed to a language transference rule producing apparatus and characterized in that the apparatus comprises: a parallel-translation corpus;

a phrase extracting section which calculates a frequency of adjacency of words or parts of speech in a source language sentence and a target language sentence in the parallel-translation corpus, and couples words and parts of speech of a high frequency of adjacency to extract partial sentences in each of which semantic consistency is formed (hereinafter, such a partial sentence is referred to as a phrase);

a phrase determining section which, among the phrases extracted by the phrase extracting section, checks relationships between phrases of the source language and the target language with respect to a whole of a sentence to determine corresponding phrases; and a phrase dictionary which stores the determined corresponding phrases, the phrase dictionary is used when language transference is performed, and the language transference, when a source language sentence is input, matches the input sentence with the corresponding phrases stored in the phrase dictionary, thereby performing language or style transference.

Furthermore, a seventh aspect of the invention is directed to a language transference rule producing apparatus according to the sixth aspect of the invention and characterized in that the phrase determining section checks concurrent relationships between phrases of the source language and the target language, thereby determines corresponding phrases.

Furthermore, an eighth aspect of the invention is directed to a language transference rule producing apparatus according to the sixth aspect of the invention and characterized in that the apparatus further has: a morphological analyzing section which transfers the source language sentence of the parallel-translation corpus into a word string; and a word clastering section using part-of-speech which, by using a result of the morphological analyzing section, produces a parallel-translation corpus in which words of a part or all of the source language sentence and the target language sentence are replaced with speech part names, and the phrase extracting section extracts phrases from the parallel-translation corpus in which words are replaced with speech part names by the word clastering section using part-of-speech.

Furthermore, a ninth aspect of the invention is directed to a language transference rule producing apparatus according to the eighth aspect of the invention and characterized in that the apparatus has a parallel-translation word dictionary of the source language and the target language, and the word clastering section using part-of-speech replaces words which are corresponded in the parallel-translation word dictionary and in which the source language is a content word, with speech part names.

Furthermore, a tenth aspect of the invention is directed to a language transference rule producing apparatus according to the sixth aspect of the invention and characterized in that the apparatus further has: a morphological analyzing section which transfers the source language sentence of the parallel-translation corpus into a word string; and a semantic coding section which, by using a result of the morphological analyzing section, on a basis of a table in which words are classified while deeming words that are semantically similar, to be in a same class, and a same code is given to words in a same class (hereinafter, such a table is referred to as a classified vocabulary table), produces a parallel-translation corpus in which words of a part or all of the source language sentence and the target language sentence are replaced with codes of the classified vocabulary table, and the phrase extracting section extracts phrases from the parallel-translation corpus in which words are replaced with codes by the semantic coding section.

Furthermore, an eleventh aspect of the invention is directed to a language transference rule producing apparatus according to the tenth aspect of the invention and characterized in that the apparatus has a parallel-translation word dictionary of the source language and the target language, and the semantic coding section replaces only words which are corresponded in the parallel-translation word dictionary, with semantic codes.

Furthermore, a twelfth aspect of the invention is directed to a language transference rule producing apparatus according to the sixth aspect of the invention and characterized in that the phrase extracting section extracts phrases by using also a phrase definition table which previously stores word or sentence part strings that are wished to be preferentially deemed as a phrase, with pairing the source language and the target language.

Furthermore, a thirteenth aspect of the invention is directed to a language transference rule producing apparatus according to any one of the sixth to thirteenth aspects of the invention and characterized in that the apparatus has a perplexity calculating section which calculates a perplexity of a corpus, and the phrase extracting section extracts phrases by using a frequency of adjacency of words or word classes, and the perplexity.

Furthermore, a fourteenth aspect of the invention is directed to a program recording medium characterized in that the medium stores a program for causing a computer to execute functions of a whole or a part of components of the language transferring apparatus or the language transference rule producing apparatus according to any one of the first to thirteenth aspects of the invention.

BRIEF DESCRIPTION OF DRAWINGS

FIG. 7 is a view showing an example of a parallel-translation interphrase rule table and a parallel-translation phrase dictionary in the third embodiment of the invention.

FIG. 9 is a view showing an example of a phrase definition table in the fourth embodiment of the invention.

FIG. 15 is a block diagram showing the configuration of a conventional language transferring apparatus.

Figure 1:
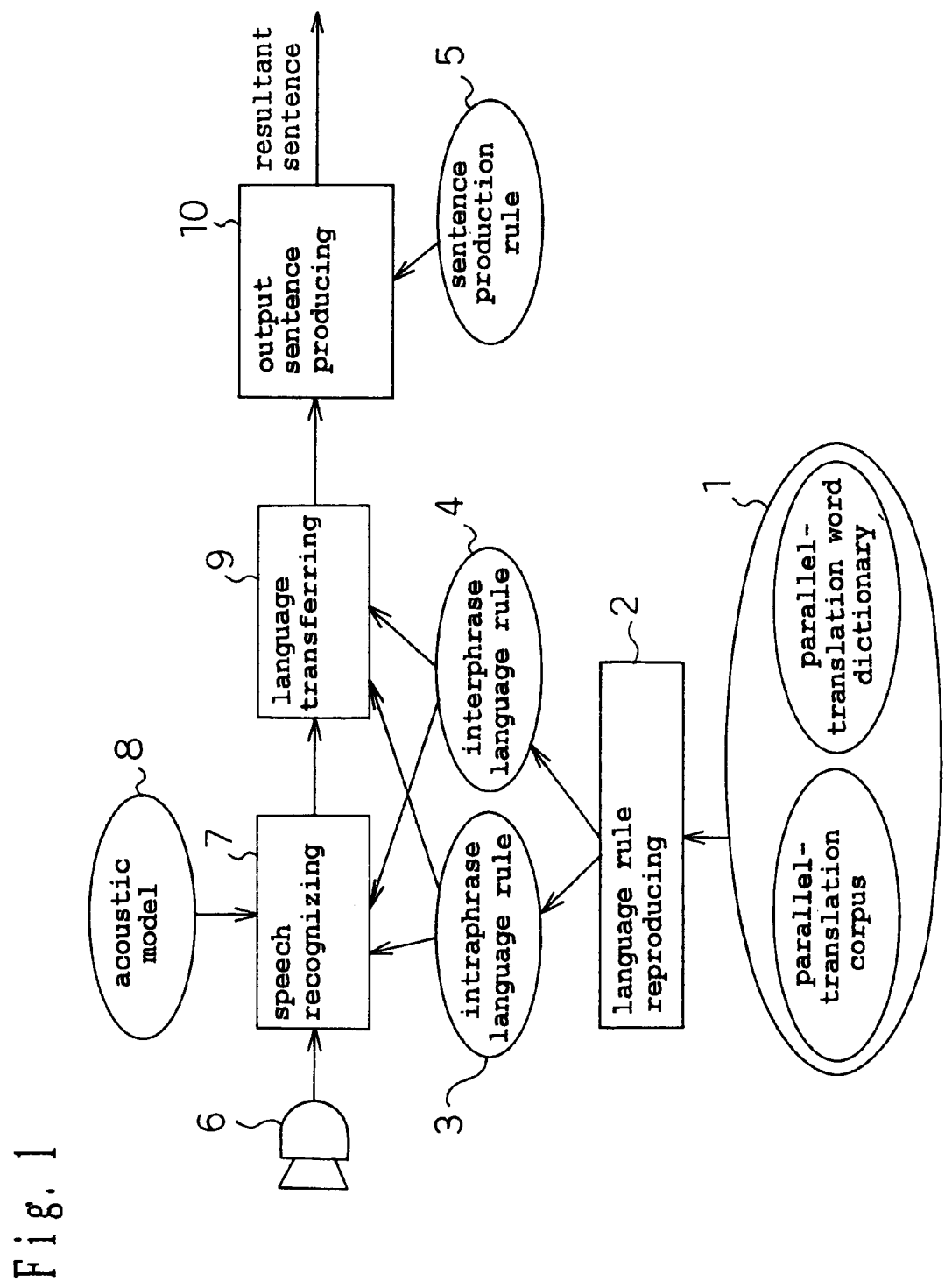
FIG. 1 is a block diagram showing the configuration of a language transferring apparatus in a first embodiment of the invention.

DESCRIPTION OF THE REFERENCE NUMERALS AND SIGNS 1 parallel-translation corpus
2 language rule reproducing section
3 intraphrase language rule
4 interphrase language rule
5 sentence production rule
6 microphone
7 speech recognizing section
8 acoustic model
9 language transferring section
10 output sentence producing section
101 parallel-translation corpus
102 morphological analyzing section
103 content word definition table
104 word clastering section using part-of-speech
105 phrase extracting section
106 phrase determining section
107 parallel-translation word dictionary 108 parallel-translation interphrase rule table
109 parallel-translation phrase dictionary
110 speech recognition
111 language transference
112 output sentence production
113 acoustic model
114 sentence production rule

BEST MODE FOR CARRYING OUT THE INVENTION

Hereinafter, embodiments of the invention will be described with reference to the drawings.

FIRST EMBODIMENT

First, a first embodiment will be described.

In the first embodiment, description will be made by using, as an example of a language transferring apparatus, an interpreting apparatus which performs transference between different languages, in the same manner as the conventional art examples. FIG. 1 is a block diagram of the interpreting apparatus of the embodiment.

Figures 1, 3:
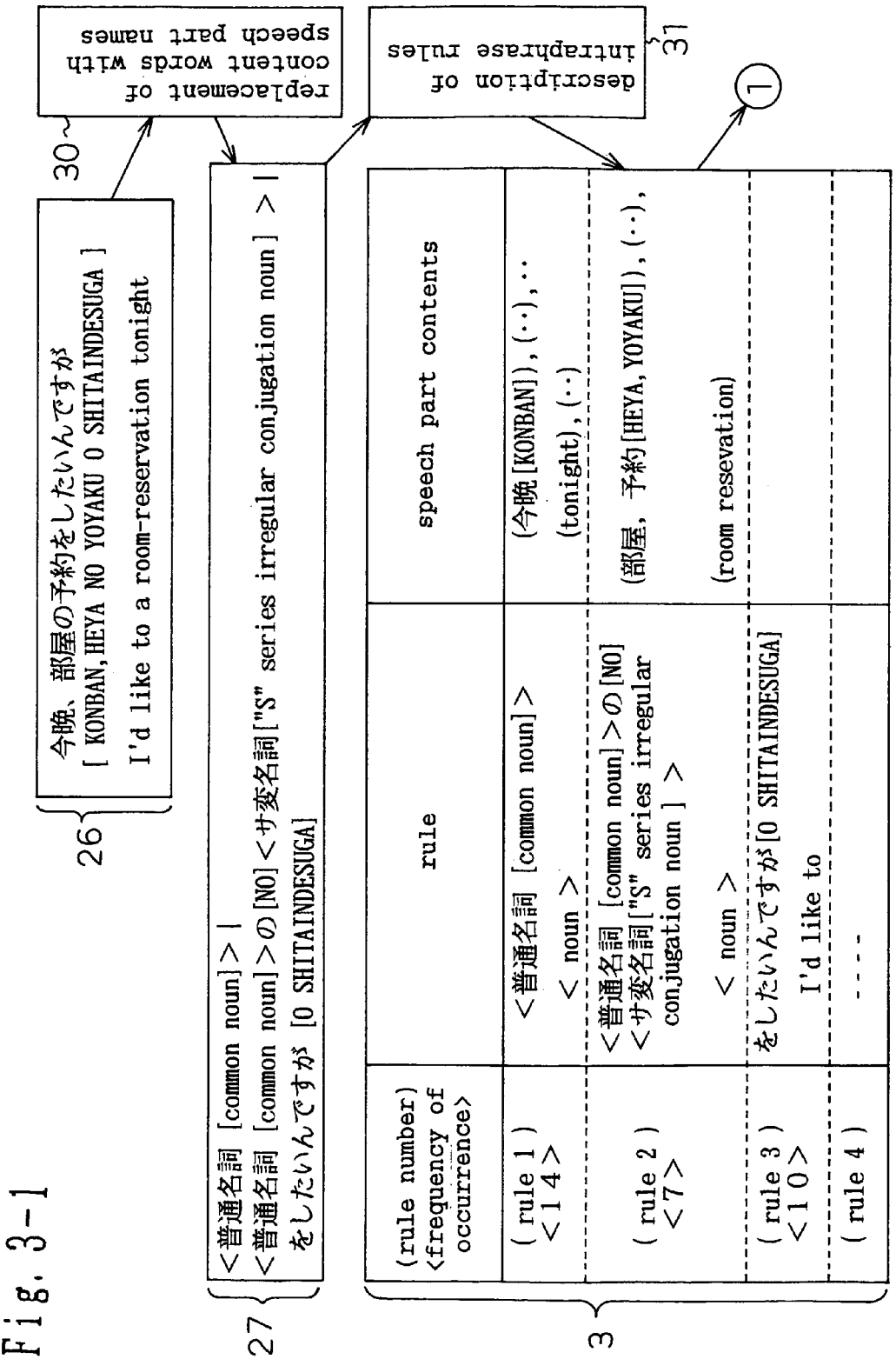
FIG. 3 is a view illustrating production of language rules in the first embodiment of the invention.
Figures 2, 3:
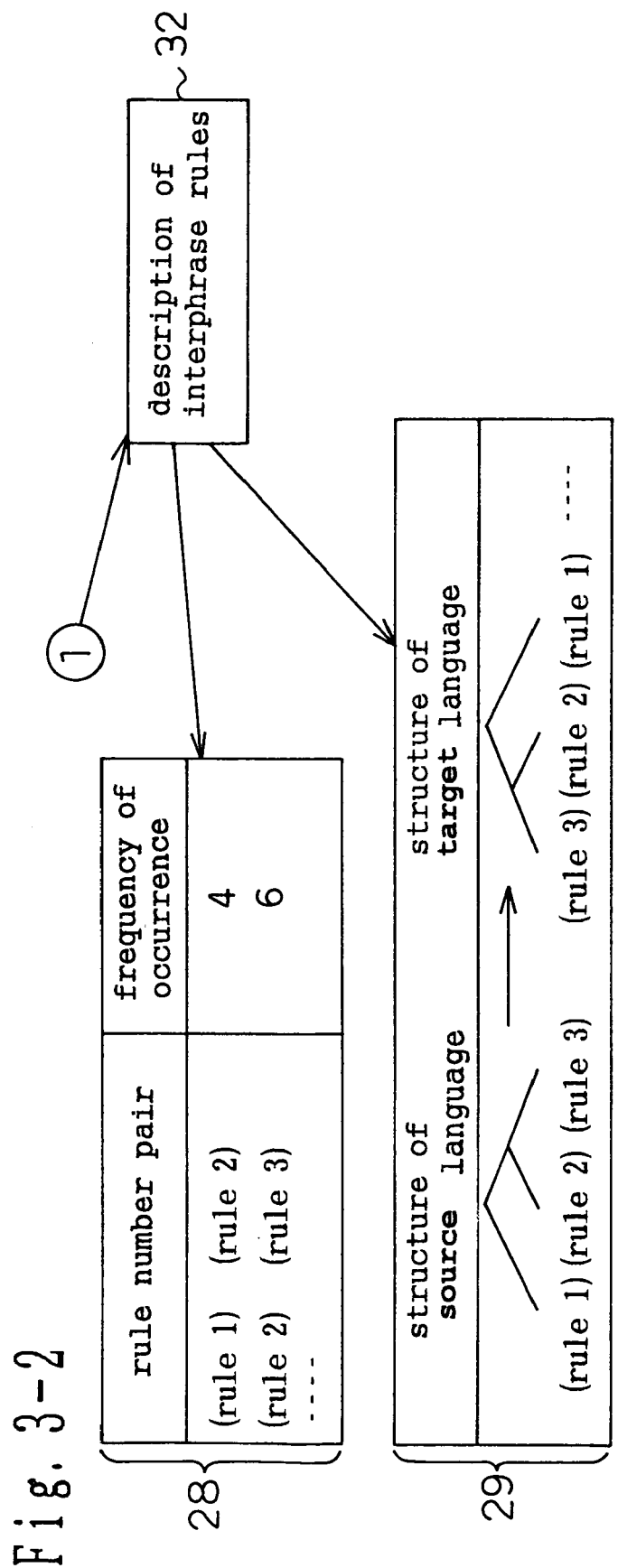

In the interpreting apparatus of the embodiment, before interpretation is performed, a language analyzing section 2 previously trains language rules of the source language sentence and the target language sentence of an uttered sentence, from a training database 1 which has a parallel-translation corpus, a parallel-translation word dictionary, and the like. FIG. 3 shows an example of training of the language rules.

In the language rule producing section 2, content words of the source language and the target language are replaced with speech part names by using, for example, a parallel-translation corpus to which speech part tags are given. In the case where a phrase in the source language and that in the target language correspond to each other as one bundle, the one bundle is set as style-independent phrases and the boundary is delimited. Namely, in the case where a style-dependent phrase in the source language and that in the target language correspond to each other as one bundle, the one bundle is set as the boundary of a style-independent phrases. In the case where a style-dependent phrase in the target language corresponding to that in the source language do not correspond as one bundle, coupling of style-dependent phrases and correction of the phrase boundary are performed until corresponding portions exist as one bundle, thereby setting the phrases as style-independent phrases. Referring to FIG. 3, sentences of the parallel-translation corpus, "KONBAN, HEYA NO YOYAKU O SHITAIN-DESUGA" and "I'd like to room-reservation tonight" 26 are replaced with speech part names by replacement of content words with speech part names 30, as "<common noun>|<common noun> NO <"S" series irregular conjugation noun>|O SHITAINDESUGA" 27. Furthermore, boundaries are delimited as style-independent phrases, or as "<common noun>", "<common noun> NO <"S" series irregular conjugation noun>", "O SHITAINDESUGA". In each style-independent phrase, thereafter, a mixed string of speech part names and words, the name of word of a portion indicted by the speech part name, and the frequency of occurrence in the parallel-translation corpus of each style-independent phrase are described as style-independent intraphrase rules 3. For all sentences of the parallel-translation corpus, the above-mentioned rules are described. In FIG. 3, the above-mentioned contents are described in 3 by description of intraphrase rules 31. In 3 of FIG. 3, rule 1 has |<common noun>| for Japanese, and |<noun>| for English. The speech part contents are "KONBAN" for Japanese, and "tonight" for English. If appearing in the parallel-translation corpus, also "ASU", "tomorrow", and the like are described in rule 1.

Moreover, concurrent relationships of each intraphrase rule are described as style-independent interphrase rules 4. When concurrent relationships are to be regularized as a phrase bi-gram, for example, the frequency of adjacency of style-independent phrases are previously described.

The above-described contents mean that, in FIG. 3, description of interphrase rules 32 describes 28. 28 is an example of a phrase bi-gram. For example, a rule number pair is "(rule 1) (rule 2)" and its frequency of occurrence is 4. This means that cases where, during a process of training from the parallel-translation corpus, rule 1 and rule 2 appear side by side in the sentence occurred four times. In the example of 28, cases where rule 2 and rule 3 appear side by side in the sentence occurred six times.

Moreover, also the syntax structures between style-independent phrases are described in the style-independent interphrase rules 4. This mean that, in FIG. 3, description of interphrase rules 32 describes 29. Since the appearance sequence of style-independent phrases in Japanese is different from that in English, the description of interphrase rules 32 make sequence relationships to correspond with one another by expressing the language structures in a tree form in 25.

In sentence production rules 5, target language rules which lack in the language rules 3 and 4 are described. In the case of Japanese-English translation, for example, article and indefinite article rules, third person singular rules, and the like are described as the contents of the sentence production rules.

The intraphrase language rules 3 and/or the interphrase language rules 4 constitute an example of the storing means in the invention.

In the case of interpretation, uttered speech of the source language is first input through a microphone 6 into a speech recognizing section 7. The speech recognizing section predicts sequentially candidates for a recognized word in time sequence, from the mixed string of speech part names and words described as the style-independent intraphrase language rules 3, and the phrase bi-gram serving as the style-independent interphrase language rules 4. A sum of an acoustic score based on the distance value between a previously trained acoustic model 8 and the input speech, and a language score based on the phrase bi-gram is set as a recognition score, and a continuous word string serving as a recognition candidate is determined by Nbest-search. The thus determined continuous word string is input into a language transferring section 9. In the intraphrase language rules 3 and the interphrase language rules 4, the rules are previously established while the source language and the target language correspond to each other. In the language transferring section 9, the continuous word string is transferred into phrase strings of the target language by using the rules, and then output. In this case, when the input phrase string of the source language coincides with the syntax structure between phrases which have been already trained, the phrase string of the target language is corrected in accordance with the syntax structure and then output.

The output target language sentence is input into an output sentence producing section 10, and grammatical unnaturalness is corrected. For example, optimizations such as addition of articles and indefinite articles, and transference of a verb into the third person singular form, the plural form, the past form in a pronoun and a verb, or the like are performed. The corrected translation resultant sentence of the target language is output, for example, in the form of a text.

In the embodiment described above, when the language rules used in speech recognition are to be trained, the rules are produced while bundled portions in which both the source language and the target language have meaning are used as one unit, and recognition is performed on the basis of restrictions of the rules. Therefore, it is possible to realize a language transferring apparatus which can solve the problem that, when an input speech sentence contains an untrained portion or speech recognition is partly erroneously performed, any portion of a translation result of the whole sentence is not output, and which can output an adequate translation result with respect to a portion that has been correctly recognized.

In the embodiment, the interpreting apparatus has been described as an example of the language transferring apparatus. This can be similarly used in another language transferring apparatus, for example, a language transferring apparatus which transfers an unliterary uttered sentence into a text sentence in written language.

SECOND EMBODIMENT

Figure 2:
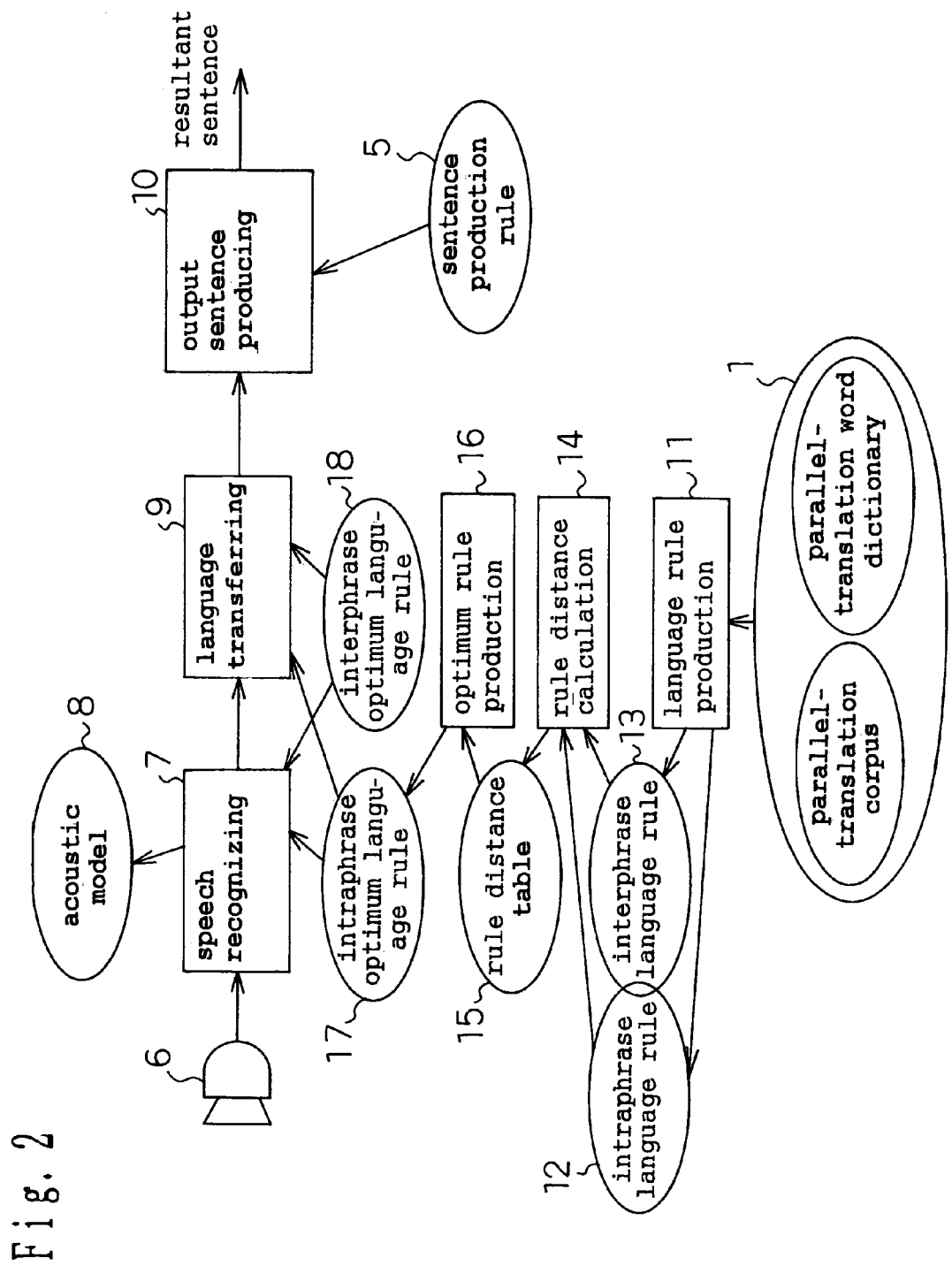
FIG. 2 is a block diagram showing the configuration of a language transferring apparatus in a second embodiment of the invention.

Next, a second embodiment will be described with reference to the drawings. In the embodiment also, in the same manner as the first embodiment, description will be made by using an interpreting apparatus. FIG. 2 is a block diagram of the interpreting apparatus of the embodiment.

Figures 1, 4:
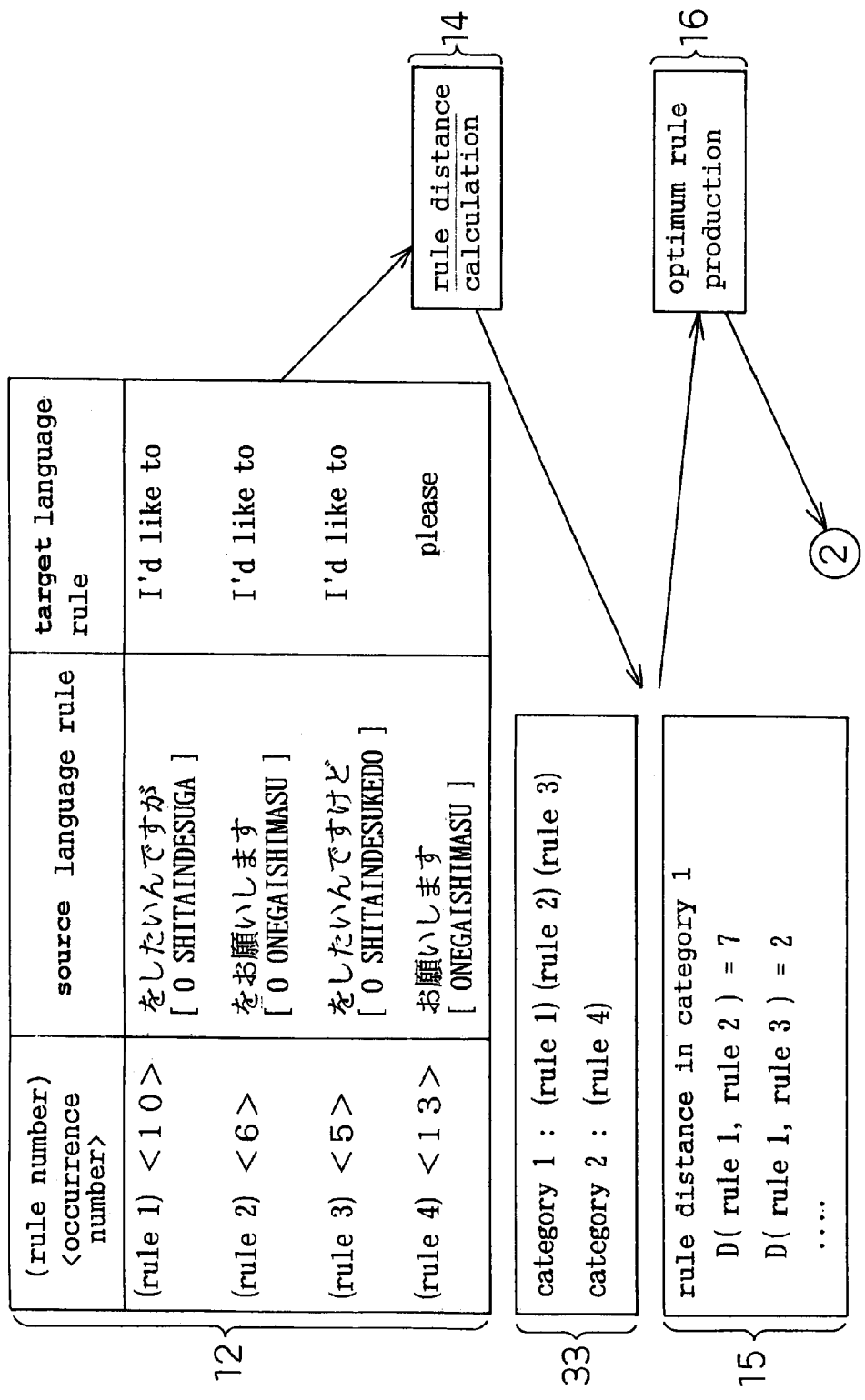
FIG. 4 is a view illustrating production of optimum language rules in the second embodiment of the invention.
Figures 2, 4:
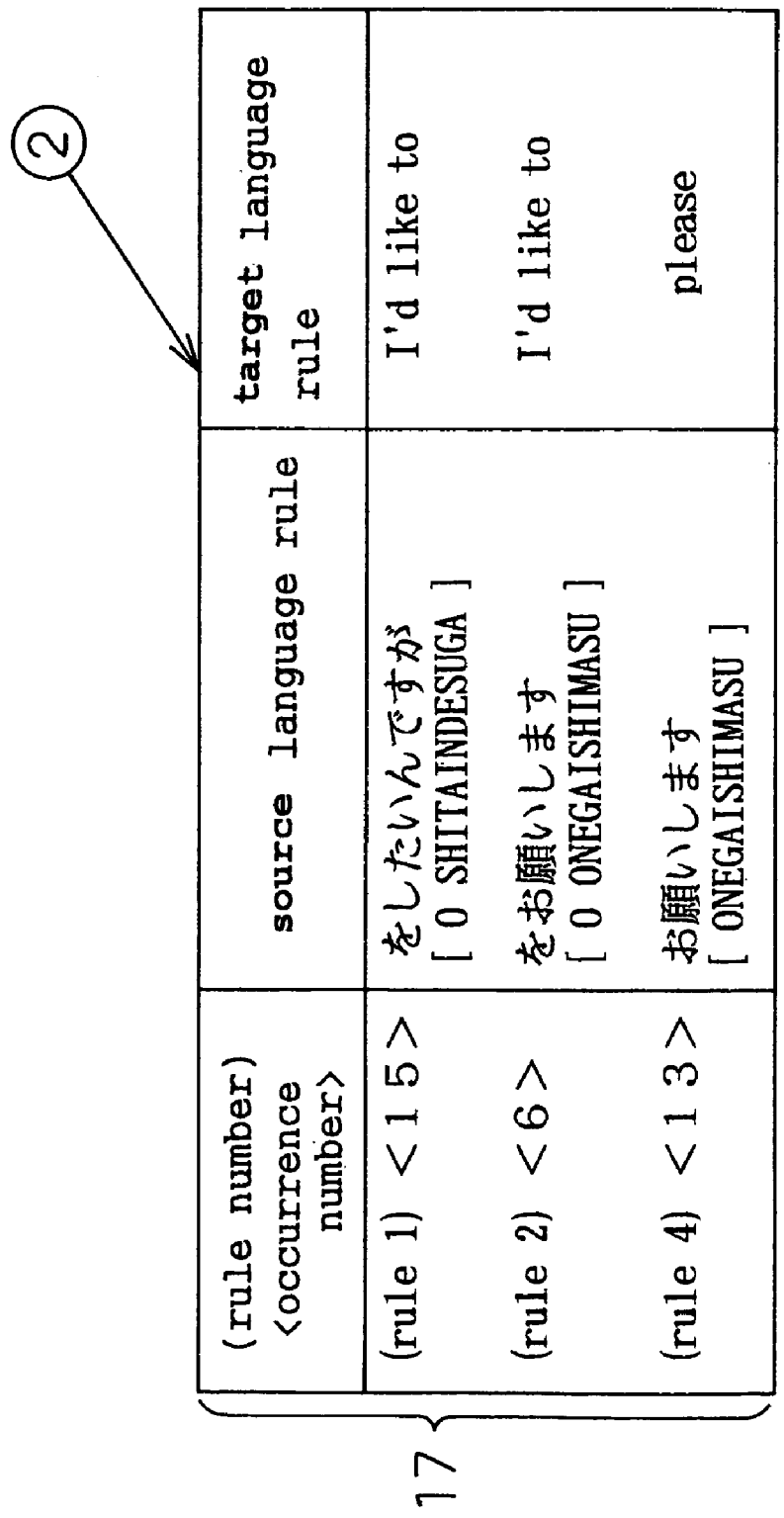

In the interpreting apparatus of the embodiment, before interpretation is performed, a language rule producing section 11 previously trains intraphrase language rules 12 and interphrase language rules 13 of the source language sentence and the target language sentence of an uttered sentence, from a training database 1 which has a parallel-translation corpus and a parallel-translation word dictionary. The trained rules are identical with the training of the language rules in the first embodiment. Next, the trained language rules are optimized. FIG. 4 shows an example of the optimization.

Among the trained style-independent phrases, phrases of the same target language are bundled as the same category. Referring to FIG. 4, 12 denotes language rules. The language rules are bundled by rule distance calculation 14, as categories as indicated in 33. Rule 1, rule 2, and rule 3 have the same target language rule of "I'd like to", and hence the rules are set into the same category. Since rule 4 has a target language rule of "please", the rule is classified into a category different from that of rule 1, rule 2, and rule 3. Next, the rule distance calculating section 14 calculates the acoustic distance between source language phrases contained in the same category. In FIG. 4, 15 shows examples of the calculated acoustic distance between source language phrases. In 15, the distance between rule 1 and rule 2 is 7, and the distance between rule 1 and rule 3 is 2.

The acoustic distance of the source language phrases contained in the same category rule is calculated in the following manner. First, when the parts of sentence are identical with each other, the same word is applied to sentence part portions of the mixed string in all the target language phrases in the category, and all the mixed strings are transferred into word strings. In order to check whether the word strings are similar in pronunciation or not, the distance with respect to a difference in a character string of each word string is then calculated by using (Ex. 1), and then written into the rule distance table 15. When the distance between phrase X={x1, x2, x3, ... xn) (where x indicates each word) consisting of an n number of words, and phrase Y={y1, y2, y3, ... ym) consisting of an m number of words is indicated by D(Xn, Ym), $$D(Xi, Yj) = \min \begin{vmatrix} D(Xi-1, Yj) & + & d(xi, yj) \\ D(Xi-1, Yj-1) & + & d(Xi, Yj) \\ D(Xi, Yj-1) & + & d(Xi, Yj) \end{vmatrix} \quad [\text{Ex. 1}]$$

where if $xi = yj$ then $d(xi, yj) = 0$ else $d(xi, yj) = 1$

In an optimum rule producing section 16, only the rule of the largest number of occurrences in phrases having a distant value which is not larger than a Fixed value is left, and all the other rules are erased. In the example of FIG. 4, for example, when the fixed value is set to 2, the rule distance between rule 1 and rule 3 which are in the same category in 33 is 2, or not larger than the fixed value of 2. In the two rules, therefore, rule 1 having a higher frequency of occurrence is adopted, and rule 3 is deleted from the rules. In accordance with the above, the number of occurrences is rewritten.

After the above-mentioned rule optimization is performed on all the rules written in the intraphrase language rules 12, only language rules which have not been erased are stored as intraphrase optimum language rules 17. In accordance with the optimized rules, the removed rules in the interphrase rules 13 are rewritten with the employed rules, and also the number of occurrences is corrected. Referring to FIG. 4, rule 3 is deleted by optimum rule production 16, and united with rule 1. In accordance with this, as indicated 17, the occurrence number of rule 1 is set to 15 which is a sum of the rule and rule 3 that has been deleted.

In sentence production rules 5, target language rules which lack in the language rules produced from the corpus are described. In the case of Japanese-English translation, for example, article and indefinite article rules, and third person singular rules, etc. are described as the contents of the sentence production rules.

In the case of interpretation, uttered speech of the source language is first input through a microphone 6 into a speech recognizing section 7. The speech recognizing section predicts sequentially candidates for a recognized word in time sequence, from the mixed string of speech part names and string words described as the style-independent intraphrase optimum language rules 17, and the frequency of adjacency of phrases as style-independent interphrase optimum language rules 18. A sum of an acoustic score based on the distance value between a previously trained acoustic model 8 and the input speech, and a language score based on a phrase bi-gram is set as a recognition score, and a continuous word string serving as a recognition candidate is determined by Nbest-search. The thus determined continuous word string is input into a language transferring section 9. In the language rules 17 and 18, the rules are previously established while the source language and the target language correspond to each other. In the language transferring section 9, the continuous word string is transferred into phrase strings of the target language by using the rules, and then output. In this case, when the input phrase string of the source language coincides with the syntax structure between phrases which has been already trained, the phrase string of the target language is corrected in accordance with the syntax structure and then output.

The output target language sentence is input into an output sentence producing section 10, and grammatical unnaturalness is corrected. For example, optimizations such as addition of articles and indefinite articles, and transference of a verb into the third person singular form, the plural form, or the past form in a pronoun and a verb are performed. The corrected translation resultant sentence of the target language is output, for example, in the form of a text.

In the embodiment described above, when the language rules used in speech recognition are to be trained, the rules are produced while bundled portions in which both the source language and the target language have meaning are used as one unit. Thereafter, when source language phrases having the same ruled target language portion are acoustically similar to one other, only the rule of the highest frequency of occurrence is adopted from the similar rules, and the remaining rules are erased. As a result, it is possible to realize an interpreting apparatus in which the increase of the number of rules due to the setting of a style-independent phrase as a unit is suppressed without lowering the performance of the language rules as far as possible, and therefore recognition and language transference of high performance are enabled.

In the embodiment, the interpreting apparatus has been described as an example of the language transferring apparatus. This can be similarly used in another language transferring apparatus, for example, a language transferring apparatus which transfers an unliterary uttered sentence into a text sentence in written language.

EMBODIMENT 3

Figure 5:
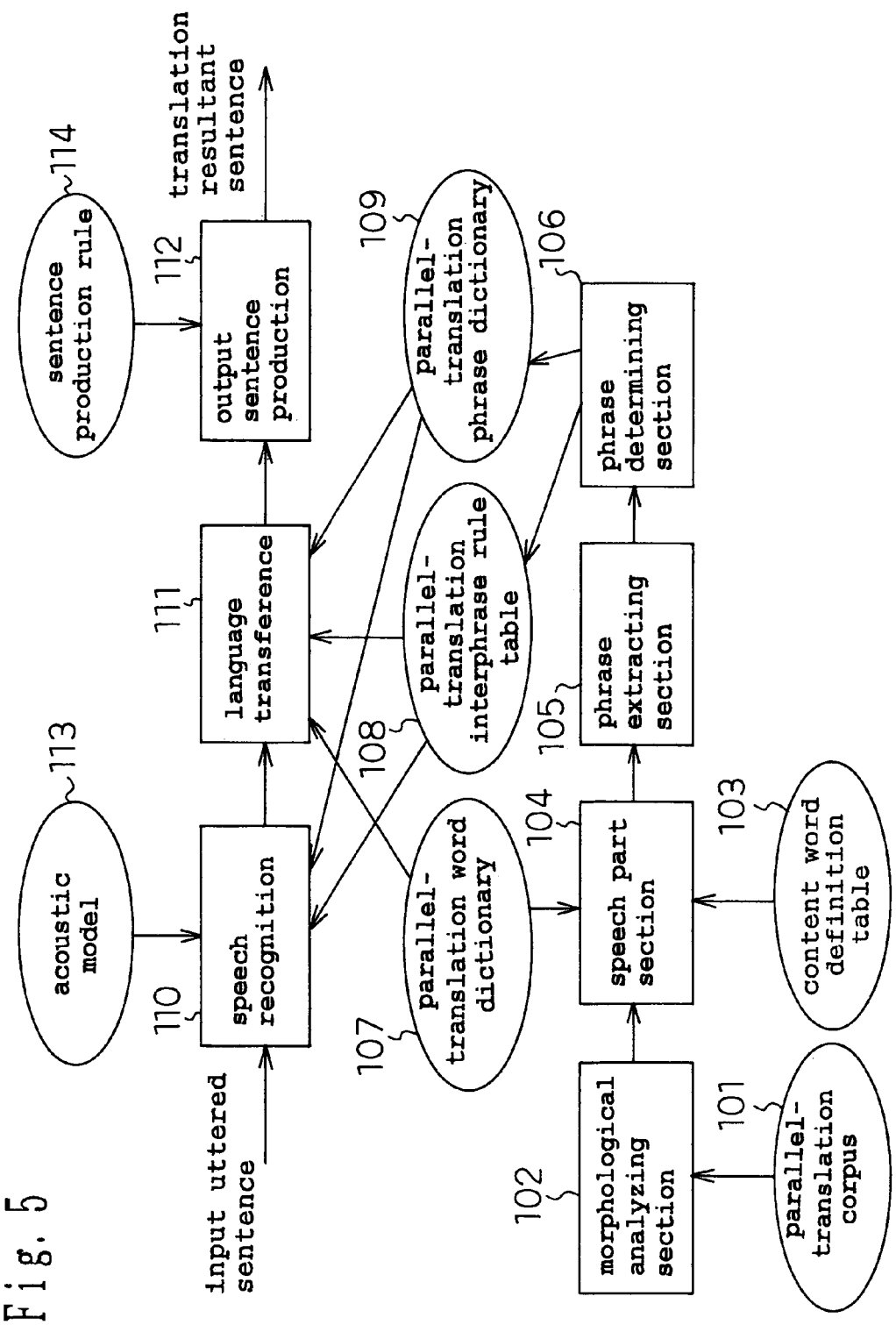
FIG. 5 is a block diagram showing the configuration of a language transferring apparatus and a language rule producing apparatus in a third embodiment of the invention.

In the embodiment, description will be made by, as an example of a language transferring apparatus, using an interpreting apparatus which performs transference between different languages, in the same manner as the conventional art examples. FIG. 5 is a block diagram of the interpreting apparatus of the embodiment.

In the embodiment, a parallel-translation corpus 101, a content word definition table 103, a parallel-translation word dictionary 107, a morphological analyzing section 102, a word clastering section using part-of-speech 104, a phrase extracting section 105, a phrase determining section 106, a parallel-translation interphrase rule table 108, and a parallel-translation phrase dictionary 109 constitute an example of the language transference rule producing apparatus of the invention. The parallel-translation phrase dictionary 109 of the embodiment is an example of the phrase dictionary set forth in claim 6 of the invention.

In the interpreting apparatus of the embodiment, before interpretation is performed, the morphological analyzing section 102 analyzes morphemes of the source language sentence in the parallel-translation corpus 101, thereby producing a parallel-translation corpus in which a speech part tag is given only to the source language sentence. For example, in an example of an uttered speech 120 of "HEYA NO YOYAKU O ONEGAISHITAINDESUGA" of FIG. 6, speech part tags as shown in 121 are given to the source language sentence. Next, the word clastering section using part-of-speech 104 produces a speech part parallel-translation corpus in which a part of word names in the source language sentence provided with speech part tags in the corpus are replaced with speech part names. In this case, it is assumed that a word which is to be replaced with a speech part name satisfies the following conditions.

(1) The word corresponds to a part of sentence listed in a content word table.

(2) A word which is registered in the parallel-translation word dictionary, and which corresponds to the target language translation in the parallel-translation word dictionary exists in a corresponding parallel-translation sentence of the target language in the corpus.

Figure 6:
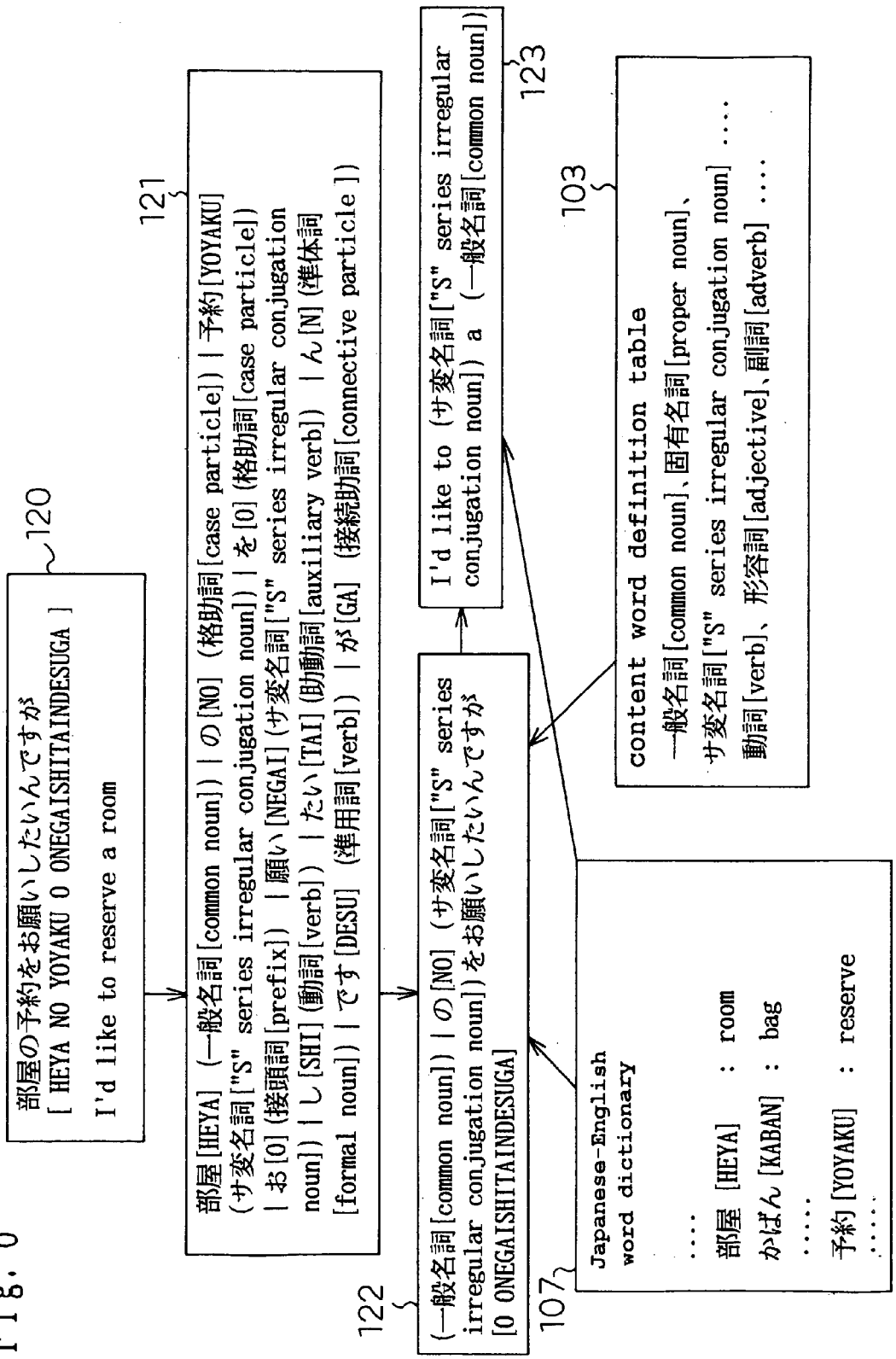
FIG. 6 is a view illustrating production of language transference rules in the third embodiment of the invention.

In the example of the content word definition table 103 of FIG. 6, among common nouns, "S" series irregular conjugation nouns, and verbs listed in the content word table, only "HEYA" and "YOYAKU" registered in the parallel-translation word dictionary 107 are replaced with parts of sentences, so that a corpus in which these words are replaced with speech part names is produced as shown in 122. Furthermore, also the corresponding word names in the parallel-translation sentence of the target language are replaced with speech part names in Japanese.

With respect to the corpus in which a part of word names are replaced with speech part names, the phrase extracting section 105 calculates a frequency of doubly chained occurrence (hereinafter, referred to as bi-gram) of each word or part of speech. The source language sentence and the target language sentence are separately subjected to this calculation. The calculation expression is shown in (Ex. 2).

$$\frac{\{\text{number of cases in which word (or part of speech) } i \text{ and word (or part of speech) } j \text{ occur adjacently}\}}{\{\text{total number of occurrences of word (or part of speech) } i + \text{total number of occurrences of word (or part of speech) } j\}} \quad (\text{Ex. 2})$$

After a bi-gram is calculated for all of the source language sentences and the target language sentences in the corpus, the phrase extracting section 5 couples two words or a speech part pair of the highest frequency of occurrence to each other, while assuming the words or the pair as one word. Then, a bi-gram is again calculated. As a result, for example, word pairs such as "O" and "NEGAI", "NEGAI" and "SHI", and "SHI" and "MASU" in each of which the words are adjacent at a higher frequency are coupled to one another to form a phrase candidate "ONEGAISHIMASU". In the target language, the word pairs of "I'd" and "like", and "like" and "to" are coupled to each other. For each of all of the source language sentences and the target language sentences, the above-mentioned coupling and calculation of a bi-gram are repeated until the values of all bi-grams do not exceed a fixed threshold value. Each of words including coupled words is extracted as a phrase candidate.

The phrase determining section 106 calculates the frequency at which respective phrases concurrently occur in the pair of the source language sentence and the target language sentence. When an i-th source language phrase is indicated by J[i] and a j-th target language phrase is indicated by E[j], the frequency of concurrence K[i, j] of phrases J[i] and E[j] is calculated by a calculation expression (Ex. 3).

$$K[i, j] = \frac{\{\text{number at which phrase } J[i] \text{ and phrase } E[j] \text{ concurrently occur in parallel-translation sentence pair}\}}{\{\text{number of occurrences of phrase } J[i] + \text{number of occurrences of phrase } E[j]\}} \quad [\text{Ex. 3}]$$

In an example of FIG. 7, for example, among three parallel-translation sentences 130 which are described as phrase strings, the frequency of concurrence of "ONE-GAISHIMASU" of the source language phrase and "I'd like to" of the target language phrase is 2/(2+3), and that of "SHITAINDESUGA" and the target language phrase is 1/(1+3). A phrase pair in which the frequency is not smaller than a fixed value is determined as parallel-translation phrases, and then registered together with the frequency and a phrase number in the parallel-translation phrase dictionary 109. Among phrase candidates which have not been determined as parallel-translation phrases, a word which has been already replaced with a speech part name is singly registered as a parallel-translation phrase in the parallel-translation phrase dictionary 109. With respect to the other portion, each corresponding word strings in the parallel-translation pair are registered as a pair in a phrase dictionary.

In the example of FIG. 7, for example, phrases are registered in the parallel-translation phrase dictionary 109 as indicated by 131.

After phrases are registered in this way, phrase numbers which concur in one sentence are recorded, and then registered as a phrase number pair in the parallel-translation interphrase rule table 108, as indicated by 132 in the example of FIG. 7.

Moreover, a phrase bi-gram of the phrase number pair is obtained, and also the phrase bi-gram is recorded in the parallel-translation interphrase rule table 108. Namely, the source language corpus is expressed by a string of phrase numbers which are registered in the parallel-translation phrase dictionary, a phrase bi-gram is obtained by using a corpus expressed by phrase numbers, and also the obtained bi-gram is recorded in the parallel-translation interphrase rule table 8. A phrase bi-gram indicating an occurrence probability of phrase j successive to phrase i is expressed by (Ex. 4).

$$\frac{\{\text{number of cases in which phrase } i \text{ and phrase } j \text{ occur adjacently in this sequence}\}}{\{\text{occurrences number of phrase } i\}} \quad [\text{Ex. 4}]$$

In 132 of FIG. 7, for example, a phrase bi-gram of phrase 3 and phrase 1 is obtained. With respect to the interphrase rule of phrase 4, phrase 5, and phrase 2, bi-grams of phrase 4 and phrase 5, and phrase 5 and phrase 2 are obtained respectively, and then recorded in the parallel-translation interphrase rule table 108.

In the case of interpretation, uttered speech of the source language is first input into a speech recognizing section 110. The speech recognizing section 113 predicts sequentially candidates for a recognized word in time sequence, from a network of words which are written as phrases in the parallel-translation phrase dictionary 109 and the phrase bi-gram written in the parallel-translation interphrase rule table 108. A sum of an acoustic score based on the distance value between a previously trained acoustic model 113 and the input speech, and a language score based on the phrase bi-gram is set as a recognition score, and a continuous word string serving as a recognition candidate is determined by Nbest-search.

The recognized continuous word string is input into a language transferring section 111. In the language transferring section 111, the input continuous word string is transferred into phrase strings in the parallel-translation phrase dictionary 109, and interphrase rules corresponding to the respective phrase strings are searched. The recognition resultant sentence of the input source language is transferred into a target language sentence from the target language phrases which are parallel-translations of the phrases, and the interphrase rules of the target language.

As described above, in the embodiment, the parallel-translation phrase dictionary 109 and the parallel-translation interphrase rule table 108 are used in both the speech recognizing section 110 and the language transferring section 111.

The transferred target language sentence is input into an output sentence producing section 112, and syntactactical unnaturalness is corrected. For example, optimizations such as addition of articles and indefinite articles, and transference of a verb into the third person singular form, the plural form, or the past form in a pronoun and a verb are performed. The corrected translation resultant sentence of the target language is output, for example, in the form of a text.

In the embodiment described above, rules are described in the form in which a source language phrase corresponds to a target language phrase, and recognition is performed in the unit of the phrase. Therefore, a language transferring apparatus is enabled in which, even when a portion of an input sentence is an unknown portion sentence or when speech recognition is partly erroneously performed, a portion that has been correctly recognized and analyzed is appropriately processed and output. Furthermore, parallel-translation phrases and interphrase rules are automatically determined by using the frequency of adjacency of words or parts of speech in each of the source language sentence and the target language sentence, and concurrent relationships of word strings or speech part strings of a high frequency in the parallel translation, and interpretation is performed by using the parallel-translation phrase rules. Therefore, a language rule producing apparatus is enabled which can automatically and efficiently produce a parallel-translation phrase dictionary of a high quality without requiring much manual assistance.

In the embodiment, the interpreting apparatus has been described as an example of the language transferring apparatus. This can be similarly used in another language transferring apparatus, for example, a language transferring apparatus which transfers an unliterary uttered sentence into a text sentence in written language.

EMBODIMENT 4

Figure 8:
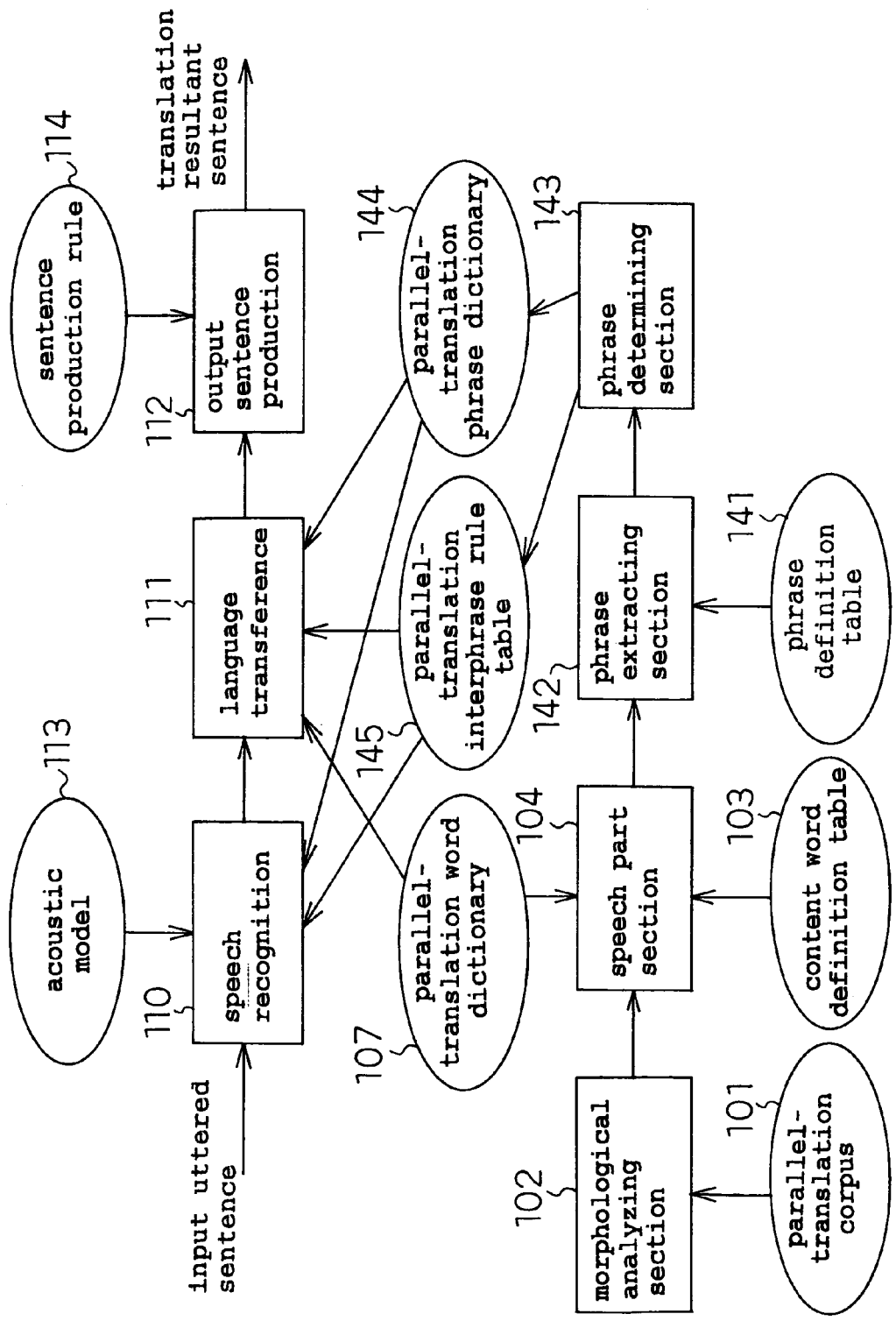
FIG. 8 is a block diagram showing the configuration of a language transferring apparatus and a language rule producing apparatus in a fourth embodiment of the invention.

In the embodiment also, as an example of a language transferring apparatus, description will be made by using an interpreting apparatus which performs transference between different languages, in the same manner as the third embodiment. FIG. 8 is a block diagram of the interpreting apparatus of the embodiment.

In the embodiment, a parallel-translation corpus 101, a content word definition table 103, a parallel-translation word dictionary 107, a morphological analyzing section 102, a word clastering section using part-of-speech 104, a phrase extracting section 142, a phrase determining section 143, a parallel-translation interphrase rule table 145, a parallel-translation phrase dictionary 144, and a phrase definition table 141 constitute an example of the language transference rule producing apparatus of the invention. The parallel-translation phrase dictionary 144 of the embodiment is an example of the phrase dictionary set forth in claim 6 of the invention.

In the interpreting apparatus of the embodiment, before interpretation is performed, morphemes are first analyzed, and a parallel-translation corpus in which a speech part tag is given is then produced in the same manner as the third embodiment.

Next, in accordance with the phrase definition table 141 in which word or speech part strings that are wished to be extracted as a phrase are previously described with being regularized, the phrase extracting section 142 couples words or parts of speech corresponding to the rules. In an example of 141 of FIG. 9, for example, "O+(verb)+TAI" are coupled as words in accordance with rules such as "verb+auxiliary verb" and "case particle+verb". With respect to the corpus in which a part of content words are replaced with speech part names and such word or speech part strings are coupled to be deemed as one word, a frequency of doubly chained occurrence (hereinafter, referred to as bi-gram) of each word or part of speech is calculated. The source language sentence and the target language sentence are separately subjected to this calculation. The calculation expression is identical with (Ex. 2).

In the same manner as the third embodiment, the process is repeated until the values of all bi-grams do not exceed a fixed threshold value. Each of words including coupled words is extracted as a phrase candidate. The phrase determining section produces the parallel-translation phrase dictionary 144 and the parallel-translation interphrase rule table 145 in the same manner as the third embodiment. In FIG. 9, 151 is an example of the corpus in which words or parts of speech are coupled in accordance with the phrase definition table, and 152 is an example of the produced parallel-translation phrase dictionary 144.

In interpretation also, the embodiment operates in the same manner as the third embodiment.

In the embodiment described above, words or parts of speech are coupled in accordance with rules of word or speech part strings which are wished to be deemed as previously defined phrases, and thereafter parallel-translation phrases and interphrase rules are automatically determined by using the frequency of adjacency of words or parts of speech in each of the source language sentence and the target language sentence, and concurrent relationships of word strings or speech part strings of a high frequency in the parallel translation, and language or style transference is performed by using the parallel-translation phrase rules. Therefore, it is possible to provide a language transference rule producing apparatus which can produce a parallel-translation phrase dictionary of a high quality at a higher efficiency, in a range in which manual assistance is suppressed to a minimum level.

The parallel-translation phrase in the embodiment is an example of the corresponding phrases in the invention.

In the embodiment, the interpreting apparatus has been described as an example of the language transferring apparatus. This can be similarly used in another language transferring apparatus, for example, a language transferring apparatus which transfers an unliterary uttered sentence into a text sentence in written language.

EMBODIMENT 5

Figure 10:
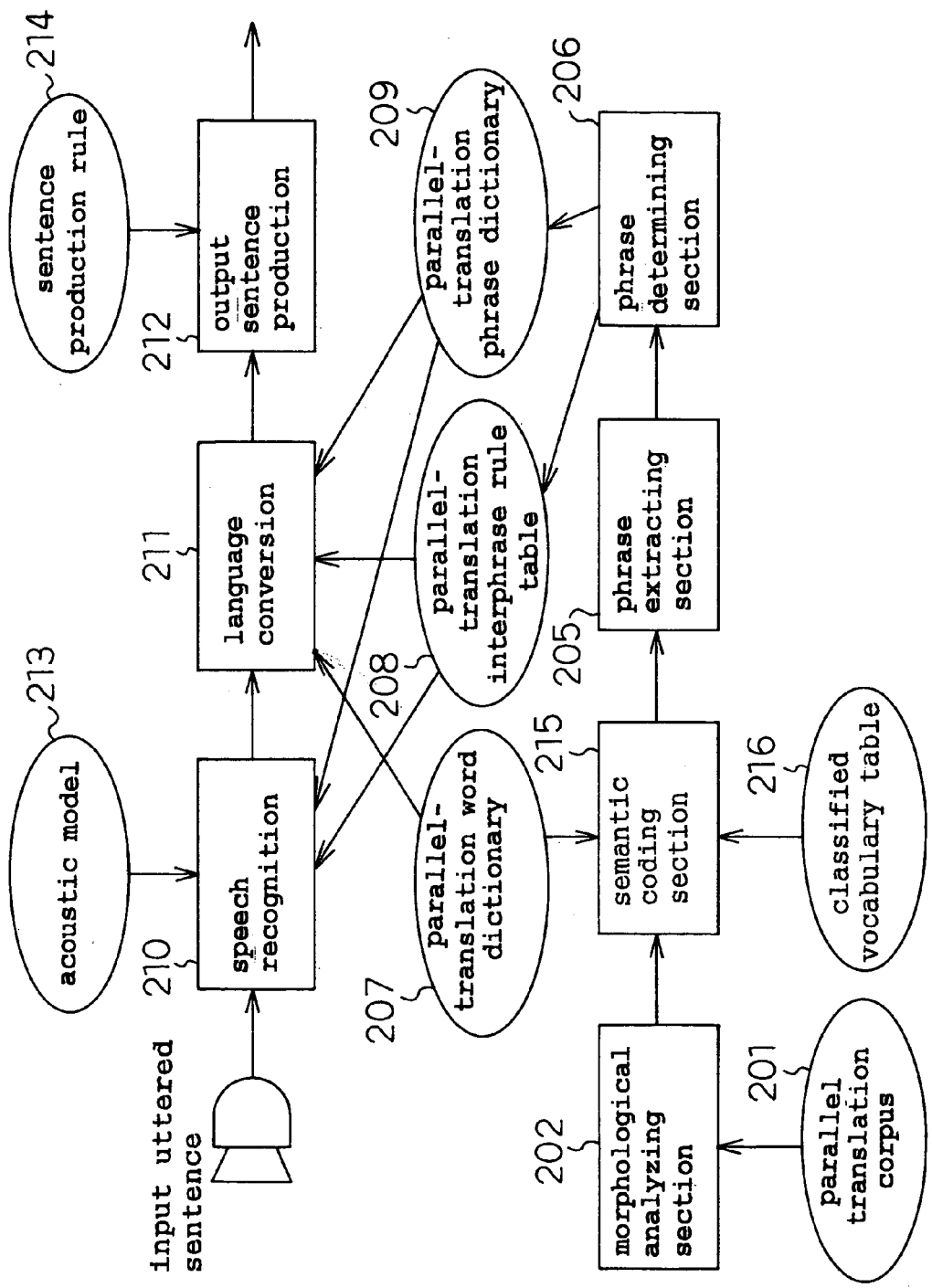
FIG. 10 is a block diagram showing the configuration of a language transferring apparatus and a language rule producing apparatus in a fifth embodiment of the invention.

In the third embodiment, construction of language rules which are more general and have a high quality is realized by, when the rules are to be constructed, replacing a part of words in the corpus with speech part names. Even when words are replaced with semantic codes in place of speech part names, it is expected to attain the same effects. Hereinafter, the embodiment will be described with reference to FIG. 10. In the embodiment also, description will be made by using an interpreting apparatus which performs transference between different languages.

In the embodiment, a parallel-translation corpus 201, a classified vocabulary table 216, a parallel-translation word dictionary 207, a morphological analyzing section 202, a semantic coding section 215, a phrase extracting section 205, a phrase determining section 206, a parallel-translation interphrase rule table 208, and a parallel-translation phrase dictionary 209 constitute an example of the language transference rule producing apparatus of the invention. The parallel-translation phrase dictionary 209 of the embodiment is an example of the phrase dictionary set forth in claim 6 of the invention.

In the interpreting apparatus of the embodiment, the morphological analyzing section 202 analyzes morphemes of the source language sentence in the parallel-translation corpus 201, thereby giving speech part tags to the source language sentence. Next, in the morpheme strings of the source language sentence, the semantic coding section 215 compares morphemes with words written in the classified vocabulary table 216. With respect to a morpheme coinciding with a word to which a semantic code is given in the classified vocabulary table 216, the morpheme name is replaced with the semantic code, thereby transferring an input morpheme string into a morpheme string in which a part of morphemes are replaced with semantic codes. In this case, it is assumed that a morpheme to be replaced with a semantic code satisfies the following conditions.

(Conditions) A word which is registered in the parallel-translation word dictionary, and which corresponds to the target language translation in the parallel-translation word dictionary exists in a corresponding parallel-translation sentence of the target language in the corpus.

Figure 11:
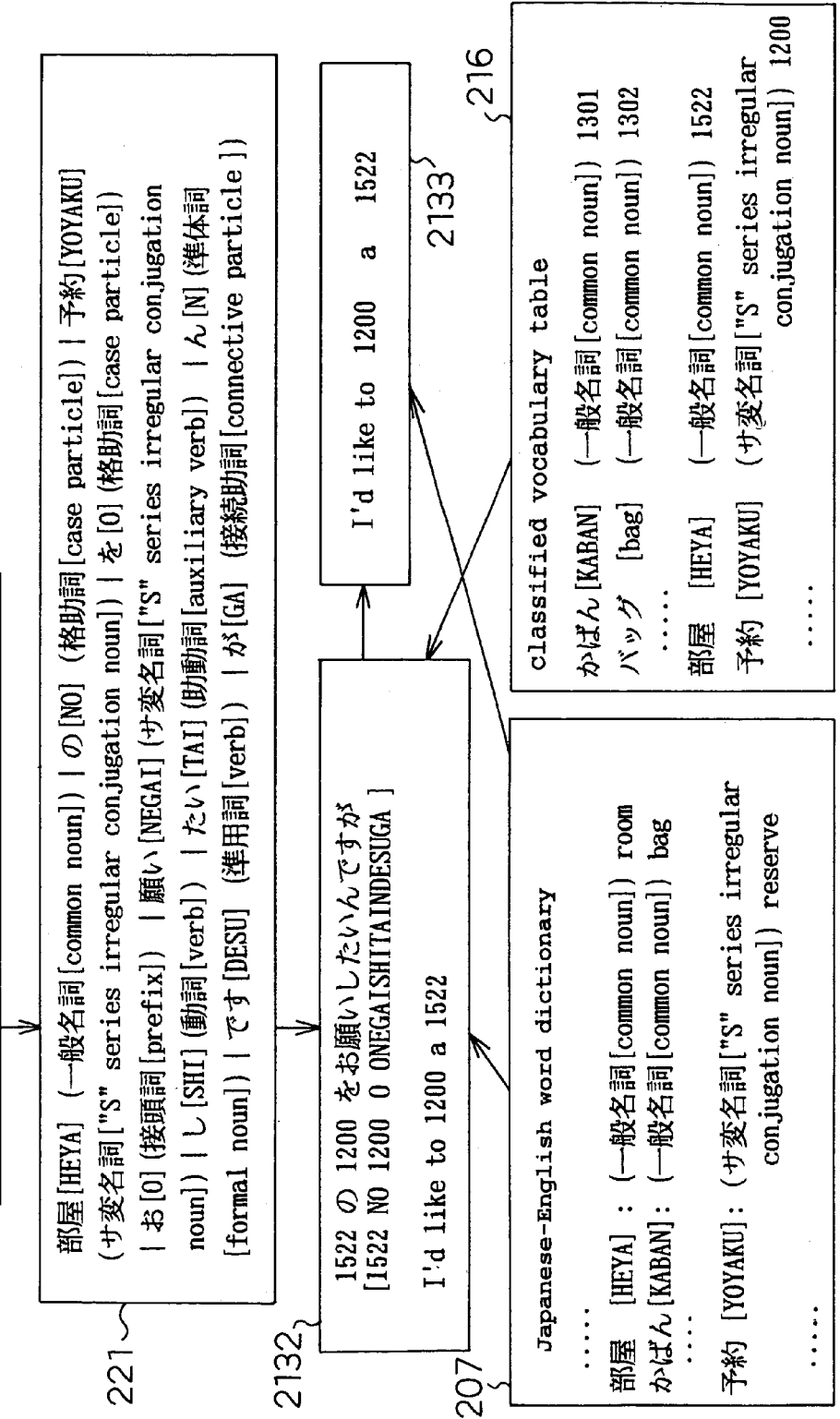
FIG. 11 is a view illustrating production of language rules in the fifth embodiment of the invention.

In the example of FIG. 11, only "HEYA" and "YOYAKU" which are registered in the parallel-translation word dictionary, and to which a code is given in the classified vocabulary table are replaced with semantic codes, so that a morpheme string in which these morphemes are replaced with semantic codes is produced as shown in 2132. Furthermore, also the word names in the parallel-translation sentence of the target language are replaced with semantic codes as shown in 2133.

With respect to the corpus in which a part of content words are replaced with semantic codes, the phrase extracting section 205 calculates a frequency of doubly chained occurrence of each word or semantic code. The source language sentence and the target language sentence are separately subjected to this calculation. The calculation expression is shown in (Ex. 5).

$$\frac{\{\text{number of cases in which word (or semantic code) } i \text{ and}}{\{\text{total number of occurrences of word (or semantic code) } i +}$$
$$\frac{\text{word (or semantic code) } j \text{ occur adjacently}\}}{\text{total number of occurrences of word (or semantic code) } j\}} \quad (\text{Ex. 5})$$

After a bi-gram is calculated for all of the source language sentences and the target language sentences in the corpus, the phrase extracting section couples two words or a semantic code pair of the highest frequency of occurrence to each other, while assuming the words or the pair as one word. Then, a bi-gram is again calculated. As a result, for example, word pairs such as "O" and "NEGAI", "NEGAI" and "SHI", and "SHI" and "MASU" in each of which the words are adjacent at a higher frequency are coupled to one another to form a phrase candidate "ONEGAISHIMASU". In the target language, the word pairs of "I'd" and "like", and "like" and "to" are coupled to each other.

For each of all of the source language sentences and the target language sentences, the above-mentioned coupling and calculation of a bi-gram are repeated until the values of all bi-grams do not exceed a fixed threshold value. Each of words including coupled words is extracted as a phrase candidate.

In the same manner as the third embodiment, the phrase determining section 206 determines parallel-translation phrases, and registers the phrases in the parallel-translation phrase dictionary 209. Moreover, in the same manner as the third embodiment, interphrase language rules and phrase bi-grams are produced, and then registered in the parallel-translation interphrase rule table 208.

In interpretation also, the embodiment operates in the same manner as the third embodiment.

In the embodiment described above, rules are described in the form in which a source language phrase corresponds to a target language phrase, and recognition is performed in the unit of the phrase. Therefore, a language transferring apparatus is enabled in which, even when a portion of an input sentence is an unknown portion sentence or when speech recognition is partly erroneously performed, a portion that has been correctly recognized and analyzed is appropriately processed and output. Furthermore, parallel-translation phrases and interphrase rules are automatically determined by using the frequency of adjacency of words or semantic codes in each of the source language sentence and the target language sentence, and concurrent relationships of word strings or semantic code strings of a high frequency in the parallel translation, and interpretation is performed by using the parallel-translation phrase rules. Therefore, a language rule producing apparatus is enabled which can automatically produce a parallel-translation phrase dictionary of a high quality without requiring much manual assistance.

In the embodiment, the interpreting apparatus has been described as an example of the language transferring apparatus. This can be similarly used in another language transferring apparatus, for example, a language transferring apparatus which transfers an unliterary uttered sentence into a text sentence in written language or the like.

EMBODIMENT 6

In the fifth embodiment, when the language rules are to be constructed, a phrase is produced by coupling a word or a part of speech, or a semantic code of a high frequency of adjacency. Alternatively, the perplexity of a sentence may be evaluated after a phrase is produced, whereby a phrase which has a higher quality and can ensure a recognition rate can be produced.

Figure 12:
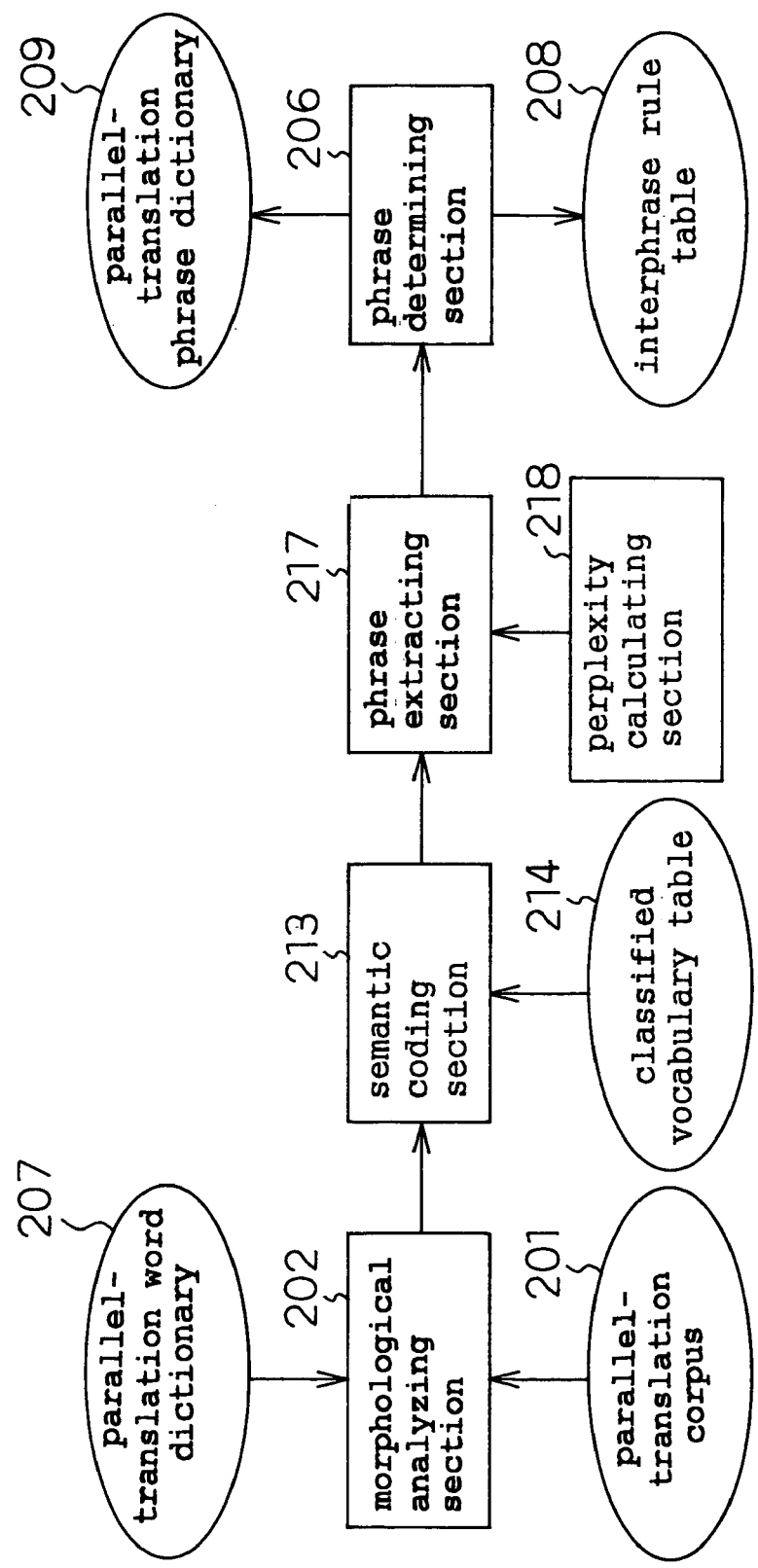
FIG. 12 is a block diagram showing the configuration of a language transference rule producing apparatus in a sixth embodiment of the invention.

Hereinafter, an embodiment of the language transference rule producing apparatus will be described with reference to FIG. 12.

A parallel-translation phrase dictionary of the embodiment is an example of the phrase dictionary set forth in claim 6 of the invention.

In the same manner as the previous embodiment, after morpheme analysis, a semantic coding section 213 produces a parallel-translation corpus in which a part of morphemes are transferred into semantic codes. Furthermore, the phrase extracting section calculates a bi-gram of each word or semantic code. The source language sentence and the target language sentence are separately subjected to this calculation. The calculation expression is identical with (Ex. 5).

In the same manner as the previous embodiment, the process is repeated until the values of all bi-grams do not exceed a fixed threshold value. Each of words including coupled words is extracted as a phrase candidate.

When, in the above process, a bi-gram of each word or semantic code is calculated and a coupling process is performed depending on the value of the bi-gram, a perplexity calculating section 218 calculates perplexities of cases where word pairs are coupled, and where word pairs are not coupled, and then compares the perplexities. A perplexity is calculated by (Ex. 6).

EX. 6

Perplexity $F=2^{H(L)}$ $H(L)=-^M\Sigma P(Wi|Wi-1)\log P(Wi|Wi-1)/M$ where P(Wi|Wi−1): probability that an i-th morpheme is Wi when an (i−1)-th morpheme is Wi−1, and M: number of kinds of two-word chains in all corpuses.

A phrase extracting section 217 removes away phrases which are proved as a result of the comparison that the perplexity is increased by coupling words or semantic codes, from the phrase candidates.

On phrases which remain as phrase candidates after the above process, determination of phrases is performed under the same conditions as that of the previous embodiment, and a parallel-translation phrase dictionary 209 and an interphrase rule table 208 are determined.

In the embodiment described above, when parallel-translation phrases are to be determined, determination is performed by using a perplexity of a parallel-translation corpus in which words are classified by means of semantic codes. Therefore, parallel-translation phrases can be automatically extracted from a corpus, and a parallel-translation phrase dictionary of a high quality can be efficiently produced without requiring much manual assistance. The criterion of a perplexity is closely related with that of determination on whether a phrase is appropriate for speech recognition or not. Therefore, phrase extraction can be automatically performed while ensuring recognition accuracy.

In the embodiment, the example wherein phrase extraction is performed by handling a corpus in which a part of words are replaced with semantic codes has been described. Even when phrase extraction is performed by handling a corpus in which a part of words are replaced with speech part names, it is expected to attain the same effects.

In the fourth embodiment, the example in which the parallel-translation corpus to which speech part tags are given is handled and phrases are extracted in accordance with the phrase definition table has been described. Also in the case where, as described in the fifth embodiment, a corpus in which a part of words are replaced with semantic codes is used and phrases are extracted in accordance with the phrase definition table, it is expected to attain the same effects.

Figure 13:
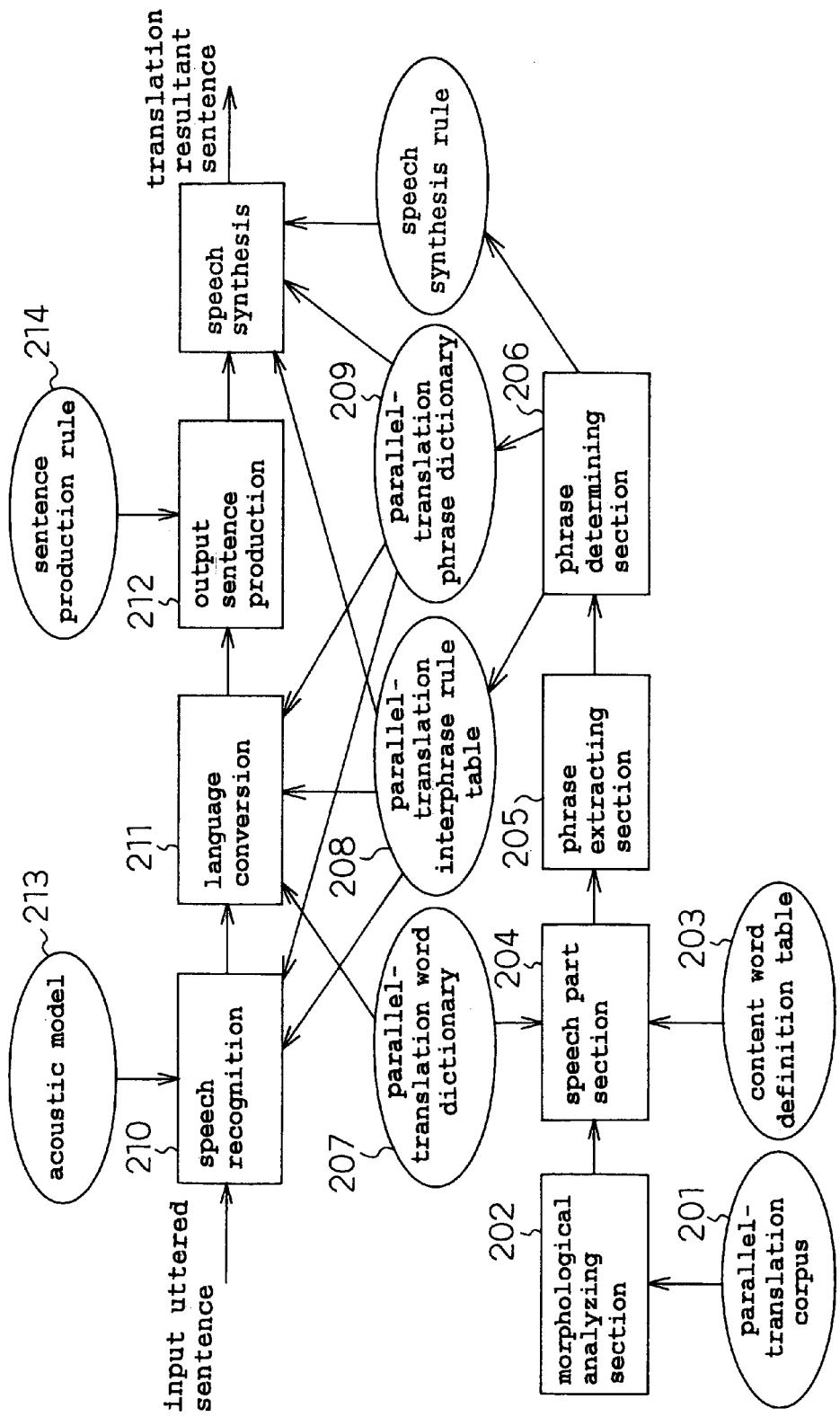
FIG. 13 is a block diagram showing an example of the configuration of a language transferring apparatus having a speech synthesizing section.
Figure 14:
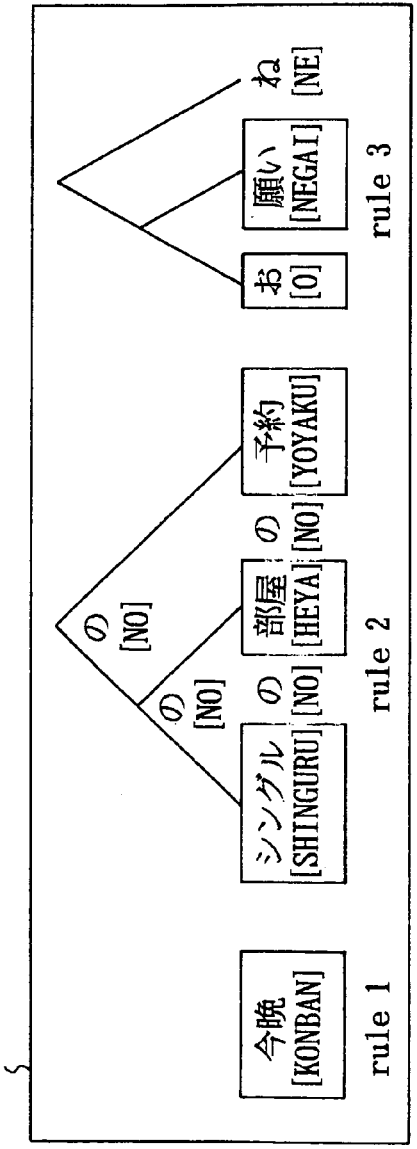
FIG. 14 is a view showing an example of language rules used in a conventional language transferring apparatus.

In the first to fifth embodiments, description has been made assuming that the language transferring apparatus is configured by the speech recognizing section, the language transferring section, and the output sentence producing section. The configuration is not restricted to this. As shown in FIG. 13, a speech synthesizing section which performs speech synthesis on the translation resultant sentence output from an output sentence producing section 212 may be disposed. The speech synthesizing section performs speech synthesis by using the parallel-translation interphrase rule table 208 and the parallel-translation phrase dictionary 209 which are identical with those used in a speech recognizing section 210 and a language transferring section 211 in speech synthesis. According to this configuration, even when an input speech sentence contains an untrained portion or speech recognition is partly erroneously performed, the problem that any portion of a speech synthesis result of the whole sentence is not output can be solved, and it is expected that an adequate speech can be output with respect to a portion that has been correctly recognized.

The whole or a part of functions of components of the language transferring apparatus or the language transference rule producing apparatus of the invention may be realized by using a dedicated hardware, or alternatively by means of software with using computer programs.

Also a program recording medium which is characterized in that the medium stores a program for causing a computer to execute the whole or a part of the functions of the components of the language transferring apparatus or the language transference rule producing apparatus of the invention belongs to the invention.

INDUSTRIAL APPLICABILITY

As apparent from the above description, the invention can provide a language transference rule producing apparatus and a language transferring apparatus which can output a recognition result that can be surely transferred into a target language sentence, and in which, even when a portion of an input sentence is an unknown portion sentence or when speech recognition is partly erroneously performed, a portion that has been correctly recognized and analyzed is therefore appropriately processed and output.

Furthermore, the invention can provide a language transference rule producing apparatus and a language transferring apparatus in which, even when an input speech sentence contains an untrained portion or speech recognition is partly erroneously performed, transference of only a portion which has been correctly recognized and to which an adequate analysis rule is applied is enabled, and it is possible to surely output a partial transference result.

Furthermore, the invention can provide a language transference rule producing apparatus in which language rules is enabled to be automatically produced without requiring much manual assistance.

Furthermore, the invention can provide a language transference rule producing apparatus in which language rules of a high quality is enabled to be automatically produced at a higher efficiency without requiring much manual assistance.

Furthermore, the invention can provide a language transference rule producing apparatus in which language rules of a high quality is enabled to be automatically produced at a higher efficiency.

The invention claimed is:

1. A language transference rule producing apparatus characterized in that said apparatus comprises:
    a parallel-translation corpus;
    a phrase extracting section which calculates a frequency of adjacency of words or parts of speech in a source language sentence and a target language sentence in said parallel-translation corpus, and couples words and parts of speech of a high frequency of adjacency to extract partial sentences in each of which semantic consistency is formed;
    a phrase determining section which, among the partial sentences extracted by said phrase extracting section, checks relationships between the partial sentences of the source language and the target language with respect to a whole of a sentence to determine corresponding partial sentences;
    a phrase dictionary which stores the determined corresponding partial phrases,
    said phrase dictionary is used when language transference is performed, and the language transference, when a source language sentence is input, matches the input sentence with the corresponding partial phrases stored in said phrase dictionary, thereby performing language or style transference;
    a morphological analyzing section which transfers the source language sentence of the parallel-translation corpus into a word string; and
    a semantic coding section which, by using a result of said morphological analyzing section, on a basis of a table in which words are classified while deeming words that are semantically similar, to be in a same class, and a same code is given to words in a same class, produces a parallel-translation corpus in which words of a part or all of the source language sentence and the target language sentence are replaced with codes of the classified vocabulary table, and
    said phrase extracting section extracts phrases from the parallel-translation corpus in which words are replaced with codes by said semantic coding section.

2. A language transference rule producing apparatus according to claim 1, characterized in that said apparatus has a parallel-translation word dictionary of the source language and the target language, and
    said semantic coding section replaces only words which are corresponded in the parallel-translation word dictionary, with semantic codes.

3. A language transference rule producing apparatus characterized in that said apparatus comprises:
    a parallel-translation corpus prepared for learning;
    a phrase extracting section which calculates a frequency of adjacency of words or parts of speech in a source language sentence and a target language sentence in said parallel-translation corpus, and couples words and parts of speech of a high frequency of adjacency to extract automatically partial sentences in each of which semantic consistency is formed without using any grammatical rule;
    a phrase determining section which, among the partial sentences extracted by said phrase extracting section, checks relationships between partial sentences of the source language and the target language to determine corresponding partial sentences; and
    a phrase dictionary which stores the determined corresponding partial phrases,
    said phrase dictionary is used when language transference is performed, and the language transference, when a source language sentence is input, matches the input sentence with the corresponding partial phrases stored in said phrases dictionary, thereby performing language or style transference.

* * * * *